United States Patent
Blom et al.

(10) Patent No.: US 10,315,783 B2
(45) Date of Patent: Jun. 11, 2019

(54) PLY BLENDING AND STACKING SEQUENCE

(71) Applicant: The Boeing Company, Chicago, IL (US)

(72) Inventors: Adriana Willempje Blom, Shoreline, WA (US); Laura Sumi Kang, Seattle, WA (US); Michael Andrew Epton, Seattle, WA (US)

(73) Assignee: The Boeing Company, Chicago, IL (US)

( * ) Notice: Subject to any disclaimer, the term of this patent is extended or adjusted under 35 U.S.C. 154(b) by 503 days.

(21) Appl. No.: 14/836,333

(22) Filed: Aug. 26, 2015

(65) Prior Publication Data

US 2017/0057666 A1    Mar. 2, 2017

(51) Int. Cl.
  *B64F 5/10*      (2017.01)
  *G06F 17/50*     (2006.01)

(52) U.S. Cl.
  CPC ............ *B64F 5/10* (2017.01); *G06F 17/5095* (2013.01); *G06F 2217/44* (2013.01); *G06F 2217/46* (2013.01); *Y02T 90/50* (2018.05)

(58) Field of Classification Search
  CPC ................................ B64F 5/10; G06F 17/5095
  See application file for complete search history.

(56) References Cited

U.S. PATENT DOCUMENTS

| | | | |
|---|---|---|---|
| 5,984,511 A * | 11/1999 | Vasey-Glandon | G06F 17/50 345/420 |
| 6,641,893 B1 | 11/2003 | Suresh et al. | |
| 7,010,472 B1 * | 3/2006 | Vasey-Glandon | G06F 17/50 700/97 |
| 7,243,055 B2 * | 7/2007 | Chen | B29C 70/30 345/420 |
| 8,181,345 B2 * | 5/2012 | Carpentier | B32B 5/12 29/419.1 |
| 2012/0323538 A1 | 12/2012 | Rassaian et al. | |

(Continued)

FOREIGN PATENT DOCUMENTS

| | | |
|---|---|---|
| CN | 102015266 A | 4/2011 |
| CN | 102841978 A | 12/2012 |
| EP | 2591911 A1 | 5/2013 |

OTHER PUBLICATIONS

Liu et al. "Composite Wing Structural Design Optimization with Continuity Constraints", Structures, Structural Dynamics, and Materials Conference and Exhibit, Apr. 2001, 2 pages.

(Continued)

*Primary Examiner* — Vanthu T Nguyen
(74) *Attorney, Agent, or Firm* — Yee & Associates, P.C.

(57) ABSTRACT

A method and apparatus for ply blending. A desired thickness and a desired stiffness distribution for a composite structure are received. A model of the composite structure is split into a plurality of panels. Lamination parameters and a quantity of plies for each panel of the plurality of panels are determined using the desired thickness and the desired stiffness distribution for the composite structure. Ply shapes for each ply of the plurality of panels are determined using an objective function. A fiber angle is determined for each ply of the plurality of panels. Each ply of a first half of a panel of the plurality of panels has a different fiber angle value than each other ply of the first half of the panel.

26 Claims, 15 Drawing Sheets

(56) References Cited

U.S. PATENT DOCUMENTS

| | | | |
|---|---|---|---|
| 2013/0118770 A1 | 5/2013 | De Jong et al. | |
| 2016/0009368 A1* | 1/2016 | Kismarton | B32B 5/12 52/834 |
| 2017/0057195 A1 | 3/2017 | Blom et al. | |

OTHER PUBLICATIONS

Office Action, dated Oct. 18, 2017, regarding U.S. Appl. No. 14/836,369, 31 pages.
Office Action, dated May 19, 2017, regarding U.S. Appl. No. 14/836,369, 17 pages.
Final Office Action, dated Jun. 13, 2017, regarding U.S. Appl. No. 14/836,369, 9 pages.
The State Intellectual Property Office of PRC Notification of the First Office Action and English translation dated Mar. 5, 2018, regarding Application No. 2016104799351, 8 pages.
The State Intellectual Property Office of PRC Notification of the First Office Action, Search Report, and English translation dated Jun. 5, 2018, regarding Application No. 2016107303165, 30 pages.
Notice of Allowance dated Oct. 15, 2018, regarding U.S. Appl. No. 14/836,369, 13 pages.
Giger et al., "A graph-based parameterization concept for global laminate optimization," Structural and Multidisciplinary Optimization, vol. 36, Issue 3, Sep. 2007, pp. 289-305.
Van Campen et al., "Blended Designs for Composite Plates with Two Concentric Lay-Ups Under Compression," International Committee on Composite Materials ICCM-17, Jul. 2009, 11 pages.
Kassapoglou, "Composite plates with two concentric layups under compression," Composites Part A, vol. 39, Issue 1, Jan. 2008, pp. 104-112.
Adams et al., "Global/Local Iteration for Blended Composite Laminate Panel Structure Optimization Subproblems," Mechanics of Advanced Materials and Structures, vol. 14, copyright 2007, 16 pages.
Liu et al., "Optimization of Blended Composite Wing Panels Using Smeared Stiffness Technique and Lamination Parameters," AIAA/ASME/ASCE/ASC Structures, Structural Dynamics, and Materials Conference, Apr. 2001, 11 pages.
Van Campen, "Optimum Lay-Up Design of Variable Stiffness Composite Structures," Delft University of Technology, Doctorate Thesis, Nov. 2011, 261 pages.
Herencia et al., "Optimization of anisotropic composite panels with T-shaped stiffeners including transverse shear effects and out-of-plane loading," Structural and Multidisciplinary Optimization, vol. 37, Dec. 2008, pp. 165-184.
Liu et al., "Composite Wing Structural Design Optimization with Continuity Constraints," AIAA/ASME/ASCE/ASC Structures, Structural Dynamics, and Materials Conference and Exhibit, American Institute of Aeronautics and Astronautics, Apr. 2001, 12 pages.
Seresta et al., "Optimal Design of Composite Wing Structures with Blended Laminates," AIAA/ISSMO Multidisciplinary Analysis and Optimization Conference, American Institute of Aeronautics and Astronautics, Sep. 2004, 13 pages.
Liu et al., "Bi-level Optimization of Blended Composite Panels," AIAA/ASME/ASCE/AHS/ASC Structures, Structural Dynamics, and Materials Conference, May 2009, 15 pages.
Blom et al., "Ply Blending and Stacking Sequence," U.S. Appl. No. 14/836,369, filed Aug. 26, 2015, 88 pages.

* cited by examiner

| | GROUP NUMBER | 1 | 2 | 3 | 4 |
|---|---|---|---|---|---|
| | NUMBER OF PLIES | 14 | 16 | 18 | 20 |
| 914 | PLY SEQUENCE 1 | 1 | 0 | 1 | 1 |
| 916 | PLY SEQUENCE 2 | 1 | 0 | 1 | 0 |
| 918 | PLY SEQUENCE 3 | 1 | 0 | 1 | 1 |
| | PLY SEQUENCE 4 | 1 | 0 | 0 | 1 |
| 920 | PLY SEQUENCE 5 | 1 | 1 | 1 | 1 |
| | PLY SEQUENCE 6 | 1 | 1 | 1 | 0 |
| 922 | PLY SEQUENCE 7 | 1 | 1 | 1 | 1 |
| 924 | PLY SEQUENCE 8 | 1 | 1 | 1 | 1 |
| 926 | PLY SEQUENCE 9 | 1 | 1 | 1 | 1 |
| | PLY SEQUENCE 10 | 1 | 1 | 0 | 1 |
| 928 | PLY SEQUENCE 11 | 1 | 1 | 1 | 1 |
| 930 | PLY SEQUENCE 12 | 1 | 1 | 1 | 1 |
| 932 | PLY SEQUENCE 13 | 1 | 1 | 1 | 1 |
| 934 | PLY SEQUENCE 14 | 1 | 1 | 1 | 1 |
| | PLY SEQUENCE 15 | 0 | 1 | 1 | 1 |
| | PLY SEQUENCE 16 | 0 | 1 | 0 | 1 |
| | PLY SEQUENCE 17 | 0 | 1 | 1 | 1 |
| | PLY SEQUENCE 18 | 0 | 1 | 1 | 1 |
| | PLY SEQUENCE 19 | 0 | 1 | 1 | 1 |
| | PLY SEQUENCE 20 | 0 | 1 | 1 | 1 |
| | PLY SEQUENCE 21 | 0 | 0 | 1 | 1 |
| 936 | PLY SEQUENCE 22 | 0 | 0 | 0 | 1 |

PLY BLENDING AND STACKING SEQUENCE

CROSS-REFERENCE TO RELATED APPLICATION

This application is related to the following U.S. Pat. No. 10,195,812, entitled "Ply Blending and Stacking Sequence," filed even date hereof, issued on Feb. 5, 2019, and is incorporated herein by reference in its entirety.

BACKGROUND INFORMATION

1. Field

The present disclosure relates generally to composite structures and, in particular, to layups for composite structures. More particularly, the present disclosure relates to a method and apparatus for determining a layup for a composite structure.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

In manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The different layers of prepreg may be laid up in different orientations, and different numbers of layers may be used depending on the thickness of the composite structure being manufactured. These layers may be laid up by hand or by using automated equipment such as a fiber placement system. After the layers of composite material have been laid up on the tool, the layers of composite material may be consolidated or cured by exposure to temperature and pressure, thus forming the final composite structure.

Traditional composite structures may include four types of composite layers: 0 degree layers, 45 degree layers, −45 degree layers, and 90 degree layers. These four angles may be conventionally and widely used to form composite structures such as composite skins. The behavior of a composite structure may be changed by varying the number of the four kinds of composite layers.

Advances in manufacturing equipment may now enable use of other fiber angles in composite layers. However, methods of designing composite structures with non-traditional angles of composite layers are needed. Further, methods of analysis for expected performance of composite structures with non-traditional angles of composite layers are needed. Therefore, it would be desirable to have a method and apparatus that take into account at least some of the issues discussed above, as well as other possible issues.

SUMMARY

In an illustrative embodiment, a method is presented. A desired thickness and a desired stiffness distribution for a composite structure are received. A model of the composite structure is split into a plurality of panels. A set of lamination parameters and a quantity of plies for each panel of the plurality of panels are determined using the desired thickness and the desired stiffness distribution for the composite structure. Ply shapes for each ply of the plurality of panels are determined using an objective function. A fiber angle value for each ply of the plurality of panels is determined such that the model of the composite structure has a stiffness equal to the desired stiffness.

In another illustrative embodiment, a method is presented. A desired thickness and a desired stiffness distribution for a composite structure are received. A model of the composite structure is split into a plurality of panels. A set of lamination parameters and a quantity of plies for each panel of the plurality of panels are determined using the desired thickness and the desired stiffness distribution for the composite structure. Ply shapes for each ply of the plurality of panels are determined using an objective function. Determining the ply shapes for each ply of the plurality of panels using the objective function comprises grouping panels of the plurality of panels with a same quantity of plies and same set of lamination parameters to form a plurality of groups and creating a plurality of ply sequences for the plurality of groups. Each panel of a group of the plurality of groups has a same layup. Each of the plurality of ply sequences represents a ply for at least one panel in the plurality of panels. A fiber angle for each ply of the plurality of panels is determined. Determining a fiber angle for each ply of the plurality of panels comprises generating equations for a plurality of lamination parameters for each group of the plurality of groups, combining the equations for each group of the plurality of groups into one system, and solving for a plurality of angle variables in the system.

A further illustrative embodiment of the present disclosure provides a method for forming a composite structure. A desired thickness and a desired stiffness distribution for a composite structure are received. A model of the composite structure is split into a plurality of panels. A set of lamination parameters and a quantity of plies for each panel of the plurality of panels are determined using the desired thickness and the desired stiffness distribution for the composite structure. Ply shapes for each ply of the plurality of panels are determined using an objective function. A fiber angle for each ply of the plurality of panels is determined. The plies are arranged according to stacking sequence rules to form a ply arrangement. The stacking sequence rules include at least one of symmetry, separation of plies with fiber angles with more than a 45 degrees difference, or avoidance of ply clusters. A composite material is laid up according to the ply arrangement to form the composite structure. The composite structure has a stiffness equal to the desired stiffness.

Yet another embodiment of the present disclosure provides a computer system. The computer system comprises a composite laminate designer, a ply shape optimizer, and a fiber angle selector. The composite laminate designer receives a desired thickness and a desired stiffness distribution for a composite structure, splits a model of the composite structure into a plurality of panels, and determines a set of lamination parameters and a quantity of plies for each panel of the plurality of panels using the desired thickness and the desired stiffness distribution for the composite structure. The ply shape optimizer determines ply shapes for each ply of the plurality of panels using an objective function. The fiber angle selector determines a fiber angle for each ply of the plurality of panels, such that the model of the composite structure has a stiffness equal to the desired stiffness.

A yet further embodiment of the present disclosure provides a computer program product for designing a composite structure. The computer program product comprises a computer readable storage media and first program code, second program code, third program code, fourth program code, and fifth program code each stored on the computer readable storage media. The first program code, stored on the computer readable storage media, receives a desired thickness and a desired stiffness distribution for a composite structure. The second program code, stored on the computer readable storage media, splits a model of the composite structure into a plurality of panels. The third program code, stored on the computer readable storage media, determines a set of lamination parameters and a quantity of plies for each panel of the plurality of panels using the desired thickness and the desired stiffness distribution for the composite structure. The fourth program code, stored on the computer readable storage media, determines ply shapes for each ply of the plurality of panels using an objective function. The fifth program code, stored on the computer readable storage media, determines a fiber angle for each ply of the plurality of panels, such that the model of the composite structure has a stiffness equal to the desired stiffness distribution.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed to be characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of ply sequences for a plurality of groups of panels in accordance with an illustrative embodiment;

DETAILED DESCRIPTION

Figure 1:
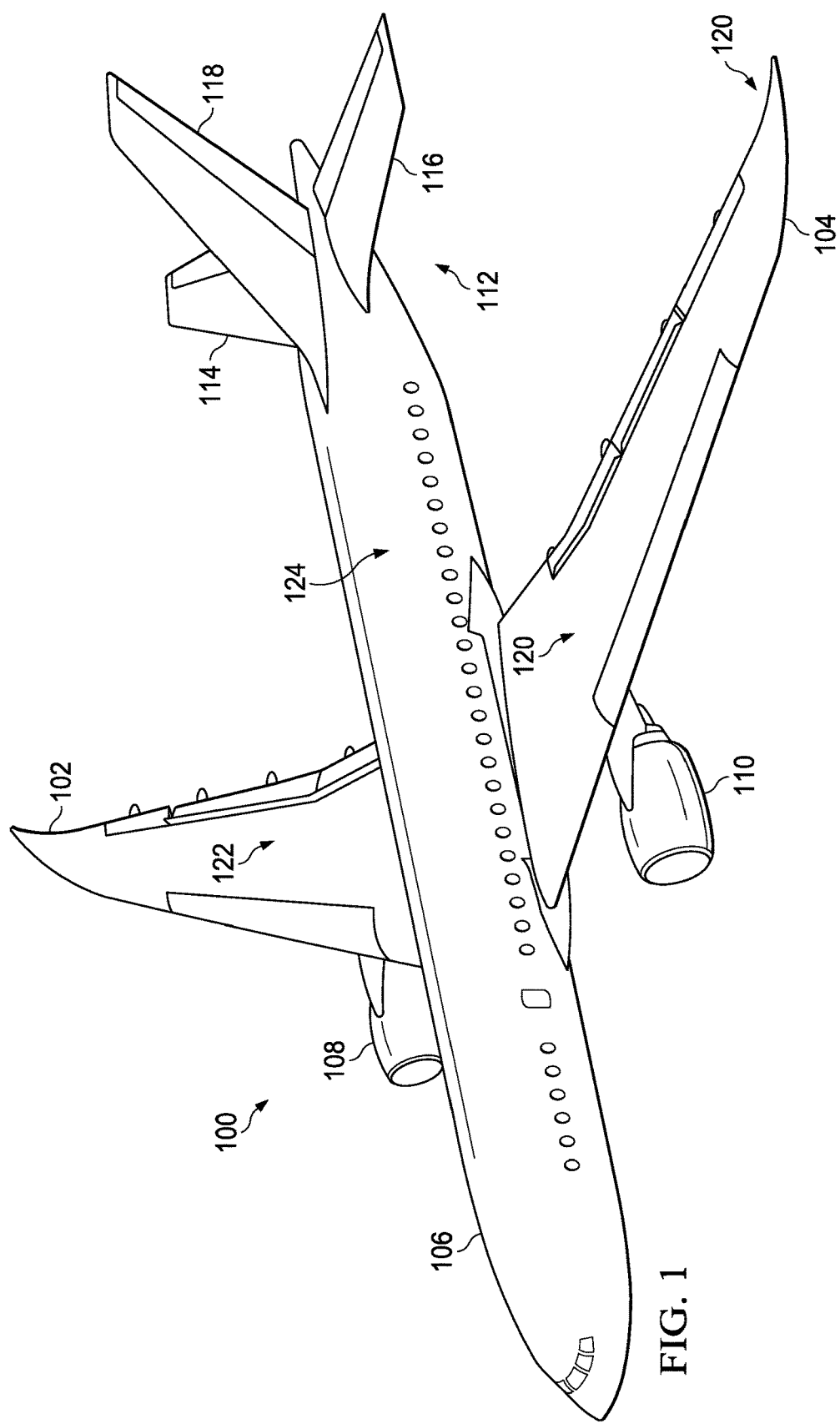
FIG. 1 is an illustration of an aircraft in which an illustrative embodiment may be implemented.

The different illustrative embodiments recognize and take into account one or more different considerations. For example, the different illustrative embodiments recognize and take into account that the shapes of composite layers in traditional composite structures may not take into account how the shapes of the layers may affect manufacturing rate.

The different illustrative embodiments recognize and take into account that it may be desirable to replace a traditional composite layup with a non-traditional layup. For example, a component typically formed of a traditional layup may have desirable characteristics if formed of a non-traditional layup having the same stiffness as the traditional layup.

The different illustrative embodiments recognize and take into account that load paths are driven by stiffness. Thus, it would be desirable for the non-traditional layup to have the same stiffness as the traditional layup it is replacing. Changing the stiffness of one component affects not only the behavior of that component, but also of the other components in the structure.

The different illustrative embodiments recognize and take into account that it may be desirable to replace a traditional composite layup with a non-traditional layup for many reasons. Changing from a traditional layup to a non-traditional layup may avoid undesirable failure modes by changing the fiber angle arrangement.

The different illustrative embodiments recognize and take into account that it may be desirable to replace a traditional laminate with a non-traditional laminate if the original thicknesses for the component were not specified in integer multiples of a ply thickness. The different illustrative embodiments further recognize and take into account that changing from a traditional layup to a non-traditional layup may create a composite component having the same stiffness properties but with a different ply thickness.

The different illustrative embodiments also recognize and take into account that certain ply angles may cause undesirable manufacturing results. Thus, the different illustrative embodiments recognize and take into account that replacing a traditional layup with a non-traditional layup may avoid using the certain ply angles that may cause undesirable manufacturing results.

The different illustrative embodiments also recognize and take into account that determining a sequence of composite layers for a single non-traditional composite layup may be performed using lamination parameters. Lamination parameters are a compact representation of a stacking sequence of layers. Lamination parameters may be non-dimensional parameters that together with thickness and material invariants describe a laminate stiffness matrix independent of the number of plies.

The different illustrative embodiments recognize and take into account that a composite may be an N ply layup with angles $(\theta_1, \theta_2, \ldots \theta_N)$ and ply locations $(z_0 = -t/2, z_0 < z_1 < z_2, \ldots z_N = t/2)$ where t is the total thickness of the N plies. The composite can be described using 12 lamination parameters:
$(V_{1A}, V_{2A}, V_{3A}, V_{4A})$, $(V_{1B}, V_{2B}, V_{3B}, V_{4B})$, and $(V_{1D}, V_{2D}, V_{3D}, V_{4D})$ which are defined by equations (1)-(3).

$$\begin{pmatrix} V_{1A} \\ V_{2A} \\ V_{3A} \\ V_{4A} \end{pmatrix} = \sum_{k=1}^{N} z_k - z_{k-1} \begin{pmatrix} \cos(2\theta_k) \\ \sin(2\theta_k) \\ \cos(4\theta_k) \\ \sin(4\theta_k) \end{pmatrix} \quad (1)$$

$$\begin{pmatrix} V_{1B} \\ V_{2B} \\ V_{3B} \\ V_{4B} \end{pmatrix} = \sum_{k=1}^{N} \frac{z_k^2 - z_{k-1}^2}{2} \begin{pmatrix} \cos(2\theta_k) \\ \sin(2\theta_k) \\ \cos(4\theta_k) \\ \sin(4\theta_k) \end{pmatrix} \quad (2)$$

$$\begin{pmatrix} V_{1D} \\ V_{2D} \\ V_{3D} \\ V_{4D} \end{pmatrix} = \sum_{k=1}^{N} \frac{z_k^3 - z_{k-1}^3}{3} \begin{pmatrix} \cos(2\theta_k) \\ \sin(2\theta_k) \\ \cos(4\theta_k) \\ \sin(4\theta_k) \end{pmatrix} \quad (3)$$

For optimization, it is helpful to define normalized lamination parameters $$(\overline{V}_{1A}, \overline{V}_{2A}, \overline{V}_{3A}, \overline{V}_{4A}) = \frac{1}{t}(V_{1A}, V_{2A}, V_{3A}, V_{4A}) \quad (4)$$

$$(\overline{V}_{1B}, \overline{V}_{2B}, \overline{V}_{3B}, \overline{V}_{4B}) = \frac{4}{t^2}(V_{1B}, V_{2B}, V_{3B}, V_{4B}) \quad (5)$$

$$(\overline{V}_{1D}, \overline{V}_{2D}, \overline{V}_{3D}, \overline{V}_{4D}) = \frac{12}{t^3}(V_{1D}, V_{2D}, V_{3D}, V_{4D}) \quad (6)$$

such that $-1 \leq (\overline{V}_{1A}, \overline{V}_{2A}, \overline{V}_{3A}, \overline{V}_{4A}) \leq 1$ $-1 \leq (\overline{V}_{1B}, \overline{V}_{2B}, \overline{V}_{3B}, \overline{V}_{4B}) \leq 1$ $-1 \leq (\overline{V}_{1D}, \overline{V}_{2D}, \overline{V}_{3D}, \overline{V}_{4D}) \leq 1 \quad (7)$ Additional constraints on the lamination parameters exist to ensure the combination of lamination parameters is feasible.

The relationship between the normalized lamination parameters, thickness, and the stiffness matrices A, B, D is given by equations (8)-(10):

$$\begin{pmatrix} A_{11} & A_{12} & A_{16} \\ A_{21} & A_{22} & A_{26} \\ A_{61} & A_{62} & A_{66} \end{pmatrix} = \quad (8)$$

$$t \begin{pmatrix} U_1 + U_2\overline{V}_{1A} + U_3\overline{V}_{3A} & U_4 - U_3\overline{V}_{3A} & \frac{U_2}{2}\overline{V}_{2A} + U_3\overline{V}_{4A} \\ \overline{A}_{12} & U_1 - U_2\overline{V}_{1A} + U_3\overline{V}_{3A} & \frac{U_2}{2}\overline{V}_{2A} - U_3\overline{V}_{4A} \\ \overline{A}_{16} & \overline{A}_{26} & U_5 - U_3\overline{V}_{3A} \end{pmatrix}$$

$$\begin{pmatrix} B_{11} & B_{12} & B_{16} \\ B_{21} & B_{22} & B_{26} \\ B_{61} & B_{62} & B_{66} \end{pmatrix} = \quad (9)$$

$$\frac{t^2}{4} \begin{pmatrix} U_2\overline{V}_{1B} + U_3\overline{V}_{3B} & -U_3\overline{V}_{3B} & \frac{U_2}{2}\overline{V}_{2B} + U_3\overline{V}_{4B} \\ \overline{B}_{12} & -U_2\overline{V}_{1B} + U_3\overline{V}_{3B} & \frac{U_2}{2}\overline{V}_{2B} - U_3\overline{V}_{4B} \\ \overline{B}_{16} & \overline{B}_{26} & -U_3\overline{V}_{3B} \end{pmatrix}$$

$$\begin{pmatrix} D_{11} & D_{12} & D_{16} \\ D_{21} & D_{22} & D_{26} \\ D_{61} & D_{62} & D_{66} \end{pmatrix} = \frac{t^3}{12} \quad (10)$$

$$\begin{pmatrix} U_1 + U_2\overline{V}_{1D} + U_3\overline{V}_{3D} & U_4 - U_3\overline{V}_{3D} & \frac{U_2}{2}\overline{V}_{2D} + U_3\overline{V}_{4D} \\ \overline{D}_{12} & U_1 - U_2\overline{V}_{1D} + U_3\overline{V}_{3D} & \frac{U_2}{2}\overline{V}_{2D} - U_3\overline{V}_{4D} \\ \overline{D}_{16} & \overline{D}_{26} & U_5 - U_3\overline{V}_{3D} \end{pmatrix}$$

where $(U_1, U_2, U_3, U_4,$ and $U_5)$ are material invariants that depend only on the ply material properties and are defined as follows:

$$U_1 = (3*Q_{11} + 3*Q_{22} + 2Q_{12} + 4Q_{66})/8 \quad (11)$$
$$U_2 = (Q_{11} - Q_{22})/2$$
$$U_3 = (Q_{11} + Q_{22} - 2Q_{12} - 4Q_{66})/8$$
$$U_4 = (Q_{11} + Q_{22} + 6Q_{12} - 4Q_{66})/8$$
$$U_5 = (Q_{11} + Q_{22} - 2Q_{12} + 4Q_{66})/8$$

and $$Q_{11} = \frac{E_{11}}{1 - \nu_{12}\frac{E_{22}}{E_{11}}} \quad (12)$$

$$Q_{12} = \frac{\nu_{12}E_{22}}{1 - \nu_{12}\frac{E_{22}}{E_{11}}}$$

$$Q_{22} = \frac{E_{22}}{1 - \nu_{12}\frac{E_{22}}{E_{11}}}$$

$$Q_{22} = G_{12}$$

Equations (8)-(10) can be written in matrix notation by introducing normalized A, B, D matrices ($\overline{A}, \overline{B}, \overline{D}$) as follows:

$$A = t\overline{A} \quad (13)$$

$$B = \frac{t^2}{4}\overline{B} \quad (14)$$

$$D = \frac{t^3}{12}\overline{D} \quad (15)$$

The different illustrative embodiments also recognize and take into account that determining a sequence of composite layers for adjacent non-traditional composite layups in a composite structure may be desirable. However, a method to provide continuity between layers of adjacent non-traditional composite layups that exactly match a prescribed thickness and stiffness for each layup is not known. For example, millions of stacking sequences may be possible for a given set of lamination parameters and a number of layers.

Finding combinations of stacking sequences for adjacent non-traditional composite layups that have matching fiber angles is therefore unlikely, and it would be very time-consuming to search for matching stacking sequences.

Accordingly, it may be desirable to have a method and apparatus for determining a layup for a composite structure that exactly matches a desirable thickness and stiffness distribution. For example, it may be desirable to have a method and apparatus for determining a sequence and associated fiber angles for the plies of a non-traditional composite structure.

With reference now to the Figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having a composite structure whose layup may be determined in accordance with an illustrative embodiment. For example, a layup for composite skin 120 of wing 104 may be determined in accordance with an illustrative embodiment. As another example, a layup for composite skin 122 of wing 102 may be determined in accordance with an illustrative embodiment. As yet a further example, composite skin 124 of body 106 may be determined in accordance with an illustrative embodiment.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotor-craft, and other suitable type of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a manufacturing facility, a building, and other suitable platforms.

Figure 2:
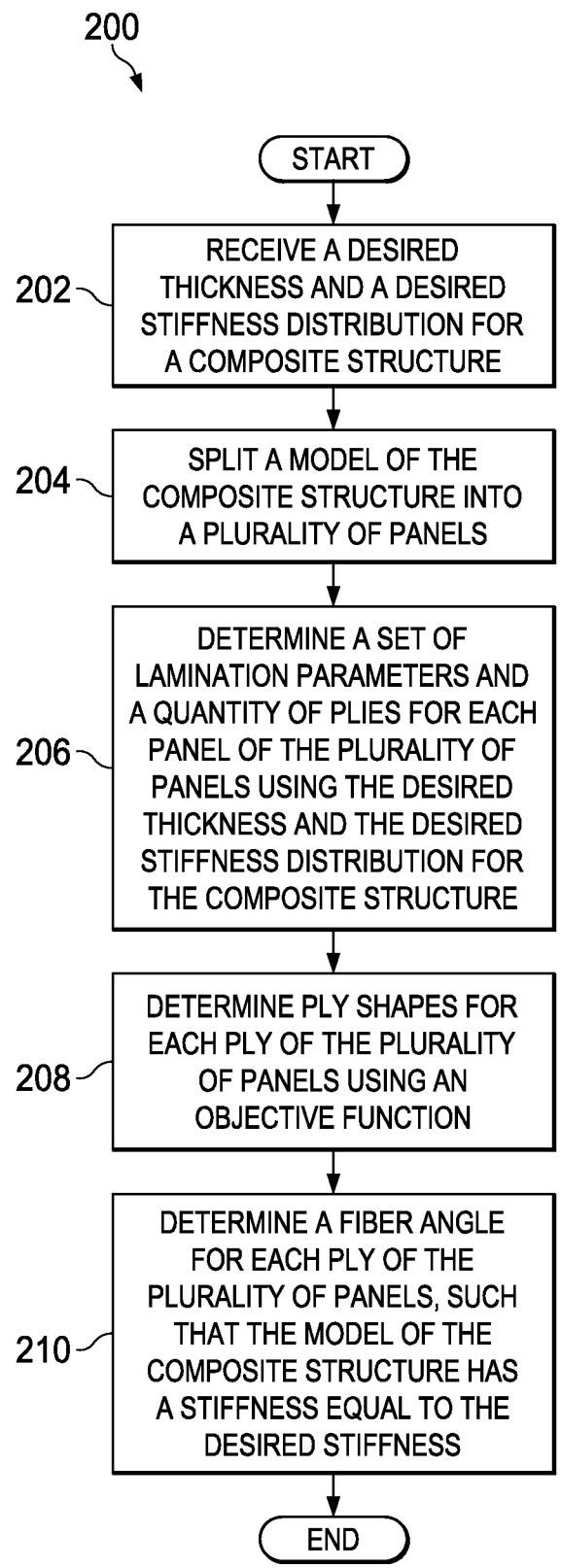
FIG. 2 is an illustration of a flowchart of a process for determining a layup for a composite structure in accordance with an illustrative embodiment.

Turning now to FIG. 2, an illustration of a flowchart of a process for determining a layup for a composite structure is depicted in accordance with an illustrative embodiment. Process 200 may be a process for determining ply arrangement 509 of FIG. 5A. In some illustrative examples, process 200 may be used in forming composite skin 120 of aircraft 100 of FIG. 1.

Process 200 may begin by receiving a desired thickness and a desired stiffness distribution for a composite structure (operation 202). In some illustrative examples, the composite structure may be a non-traditional composite laminate structure. In some illustrative examples, the desired stiffness may be presented in the form of lamination parameters.

A model of the composite structure may be split into a plurality of panels (operation 204). In some illustrative examples, the plurality of panels may be about the same size and shape. In some illustrative examples, the plurality of panels may include at least one of more than one size or more than one shape. In some illustrative examples, a first panel and a second panel of the plurality of panels have a different number of plies.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

A set of lamination parameters and a quantity of plies may be determined for each panel of the plurality of panels using the desired thickness and the desired stiffness distribution for the composite structure (operation 206). Ply shapes for each ply of the plurality of panels may be determined using an objective function (operation 208). The objective function may be used along with constraints, such as desirable conditions 541 of FIG. 5B.

There may be a number of desirable conditions for use with the objective function. In one illustrative example, in operation 208, ply shapes for each ply of plurality of panels may be determined by maximizing objective function:

$$\Phi_{obj} = \Sigma_{s=1}^{S} \Sigma_{p=1}^{P} \Sigma_{q=p+1}^{P} Y_{p,q,s} \qquad (16)$$

where s is a ply sequence variable, S is the quantity of the plurality of ply sequences, p, q are panel variables, P is the quantity of plurality of panels, and $Y_{p,q,s}$ is a binary variable that represents connectivity between panels. $Y_{p,q,s}$ is 1 if both panel p and q are present in ply sequence s and $Y_{p,q,s}$ is 0 otherwise. In integer programming, this condition may be fulfilled by the following constraints: $X_s^{\lambda(p)}$ $$Y_{p,q,s} \leq (X_s^{\lambda(p)} + X_s^{\lambda(q)})/2$$

$$Y_{p,q,s} \geq (X_s^{\lambda(p)} + X_s^{\lambda(q)} - 1)/2$$

for all Y defined on $(1 \leq p \leq P, p < q \leq P, s=1 \ldots S)$ (17)

In this equation, $X_s^{\lambda(p)}$ is a binary variable that denotes if a ply is present (value=1) or absent (value=0) in panel p for ply sequence s. The function $\lambda(p)$ provides the panel group index associated with panel p.

Desirable conditions may include the total number of ply sequences being equal to or larger than the largest quantity of plies for any of the panels. This may described by:

$$\Sigma_{s=1}^{S} X_s^l \geq t^l \ \forall l=1 \ldots L \qquad (18)$$

Where $X_x^l$ is a binary variable that is 1 when a ply in panel group l is present in ply sequence s and that is 0 otherwise, and $t^l$ is a quantity of plies for panel group l.

All ply sequences should contain at least one ply. Without this desirable condition, the solution would use fewer ply sequences than provided, which could result in a larger number of equations to be solved than the number of variables available.

$$\Sigma_{l=1}^{L} X_s^l \geq 1 \ \forall s=1 \ldots S \qquad (19)$$

Desirable conditions may include a duplicate ply limit. The duplicate ply limit may be represented as $$\Sigma_{s=1}^{S} Z_{s,k} \leq D \text{ for each unique ply sequence } k \quad (20)$$

where $Z_{s,k}$ is a binary variable that is 1 if ply sequence s matches unique ply sequence k, but is 0 otherwise, and D is the duplicate ply limit.

$$Z_{s,k} \leq 1 - (\Sigma_{l=1}^{L} |X_s^l - X_k^l|)/L$$

$$Z_{s,k} \geq 1 - \Sigma_{l=1}^{L} |X_s^l - X_k^l| \quad (21)$$

Desirable conditions may also include measures of degree of freedom. Degree of freedom may include having at least a quantity of different layers between two groups equal to the quantity of the lamination parameters to be matched, when the layups of the two groups have a difference in quantity of plies less than the quantity of the lamination parameters:

$$\Sigma_{s=1}^{S} W_{l,k,s} \leq \max(t^l, t^k) - V$$

for all groups $l$ and $k$ with thickness difference<$V$ \quad (22)

where $W_{l,k,s}$ is a binary variable that is 1 if both l and k are active on ply sequence s or 0 otherwise, where $t^l$ is quantity of plies for layup l, where $t^k$ is quantity of plies for layup k, and where V is a quantity of the lamination parameters to be matched per panel. In integer programming, the variable $W_{l,k,s}$ is defined by the two constraints below:

$$W_{l,k,s} \leq (X_s^l + X_s^k)/2$$

$$W_{l,k,s} \geq (X_s^l + X_s^k - 1)/2$$

for all $W$ defined (all groups $l$ and $k$ with thickness difference<$V$) \quad (23)

In order to increase the chances of reducing the quantity of duplicate ply sequences without introducing duplicate ply constraints, noise may be introduced into the objective function. In some illustrative examples, the objective function with noise may be represented by:

$$\Sigma_{s=1}^{S} \Sigma_{p=1}^{P} \Sigma_{q=p+1}^{P} (1+\varepsilon) Y_{p,q,s} \quad (24)$$

where ε is generated by seeded random number generation and is small enough to not affect the optimization. Here, ε may serve as a small perturbation so that generating the same shaped plies for multiple ply sequences would be discouraged.

The fiber angle for each ply of the plurality of panels may be determined, such that the model of the composite structure has a stiffness equal to the desired stiffness (operation 210). Afterwards the process terminates.

In some illustrative examples, a fiber angle for each ply may be determined using a system of equations including a plurality of lamination parameters and a plurality of angle variables. The system includes a plurality of equations for the plurality of panels. In some illustrative examples, the plurality of panels may be placed into a plurality of groups. Each of the plurality of groups may have a quantity of equations equal to the quantity of lamination parameters in the set of lamination parameters for the group. A set of equations for first group 702 of FIG. 7 may be:

$$V_1^1 = \frac{1}{14}\begin{pmatrix} \cos2\theta_1 + \cos2\theta_2 + \cos2\theta_3 + \cos2\theta_4 + \cos2\theta_5 + \cos2\theta_6 + \\ \cos2\theta_7 + \cos2\theta_8 + \cos2\theta_9 + \cos2\theta_{10} + \cos2\theta_{11} + \cos2\theta_{12} + \\ \cos2\theta_{13} + \cos2\theta_{14} \end{pmatrix} \quad (25)$$

$$V_2^1 = \frac{1}{14}\begin{pmatrix} \sin2\theta_1 + \sin2\theta_2 + \sin2\theta_3 + \sin2\theta_4 + \sin2\theta_5 + \sin2\theta_6 + \\ \sin2\theta_7 + \sin2\theta_8 + \sin2\theta_9 + \sin2\theta_{10} + \sin2\theta_{11} + \sin2\theta_{12} + \\ \sin2\theta_{13} + \sin2\theta_{14} \end{pmatrix} \quad (26)$$

$$V_3^1 = \frac{1}{14}\begin{pmatrix} \cos4\theta_1 + \cos4\theta_2 + \cos4\theta_3 + \cos4\theta_4 + \cos4\theta_5 + \cos4\theta_6 + \\ \cos4\theta_7 + \cos4\theta_8 + \cos4\theta_9 + \cos4\theta_{10} + \cos4\theta_{11} + \cos4\theta_{12} + \\ \cos4\theta_{13} + \cos4\theta_{14} \end{pmatrix} \quad (27)$$

$$V_4^1 = \frac{1}{14}\begin{pmatrix} \sin4\theta_1 + \sin4\theta_2 + \sin4\theta_3 + \sin4\theta_4 + \sin4\theta_5 + \sin4\theta_6 + \\ \sin4\theta_7 + \sin4\theta_8 + \sin4\theta_9 + \sin4\theta_{10} + \sin4\theta_{11} + \sin4\theta_{12} + \\ \sin4\theta_{13} + \sin4\theta_{14} \end{pmatrix} \quad (28)$$

In this illustrative example, the set of lamination parameters for first group 702 has four lamination parameters. Accordingly, four equations are present for first group 702. As depicted, first group 702 has equation 25, equation 26, equation 27, and equation 28.

Figure 7:
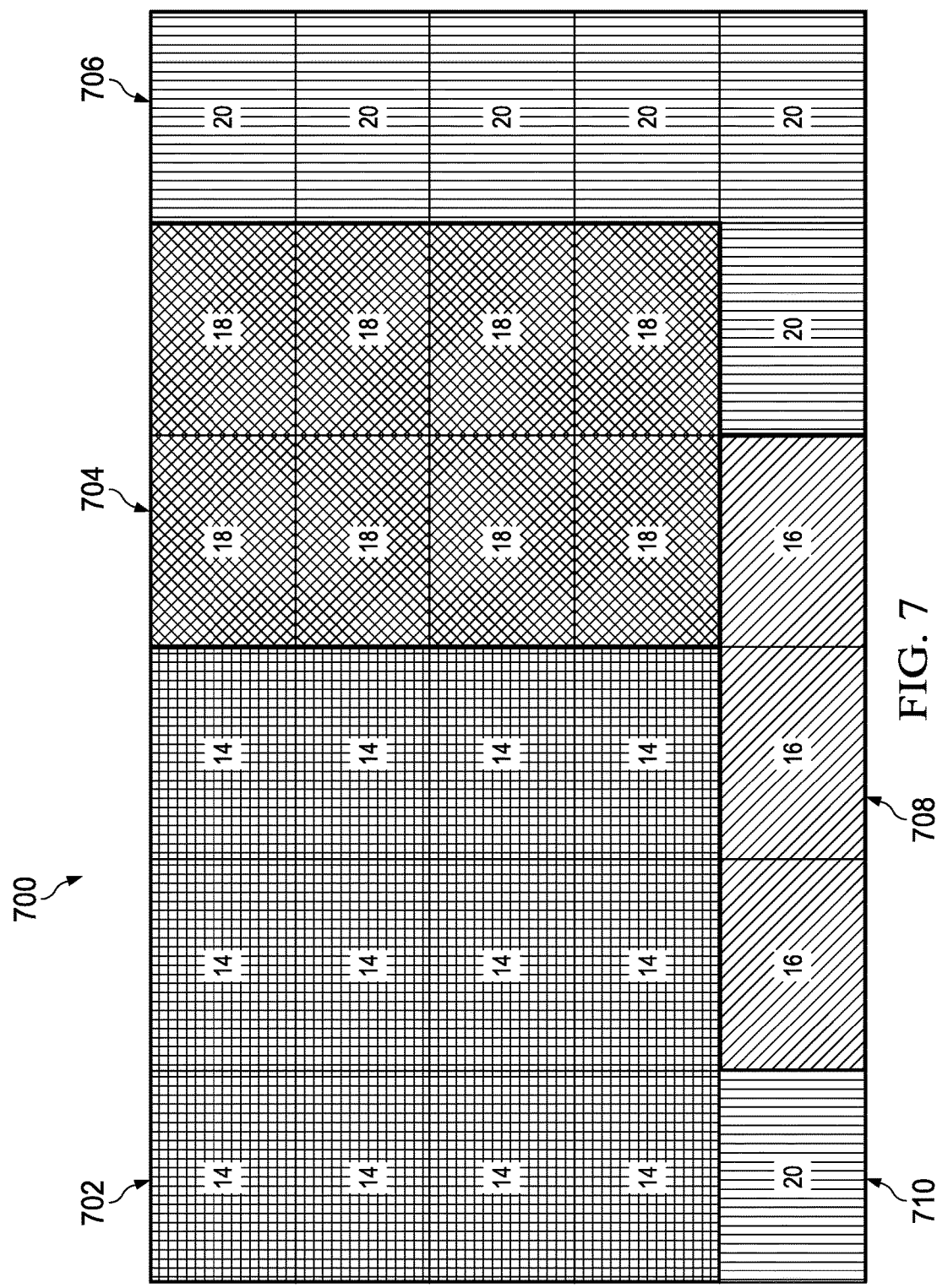
FIG. 7 is an illustration of a plurality of groups of panels in accordance with an illustrative embodiment.
Figure 8:
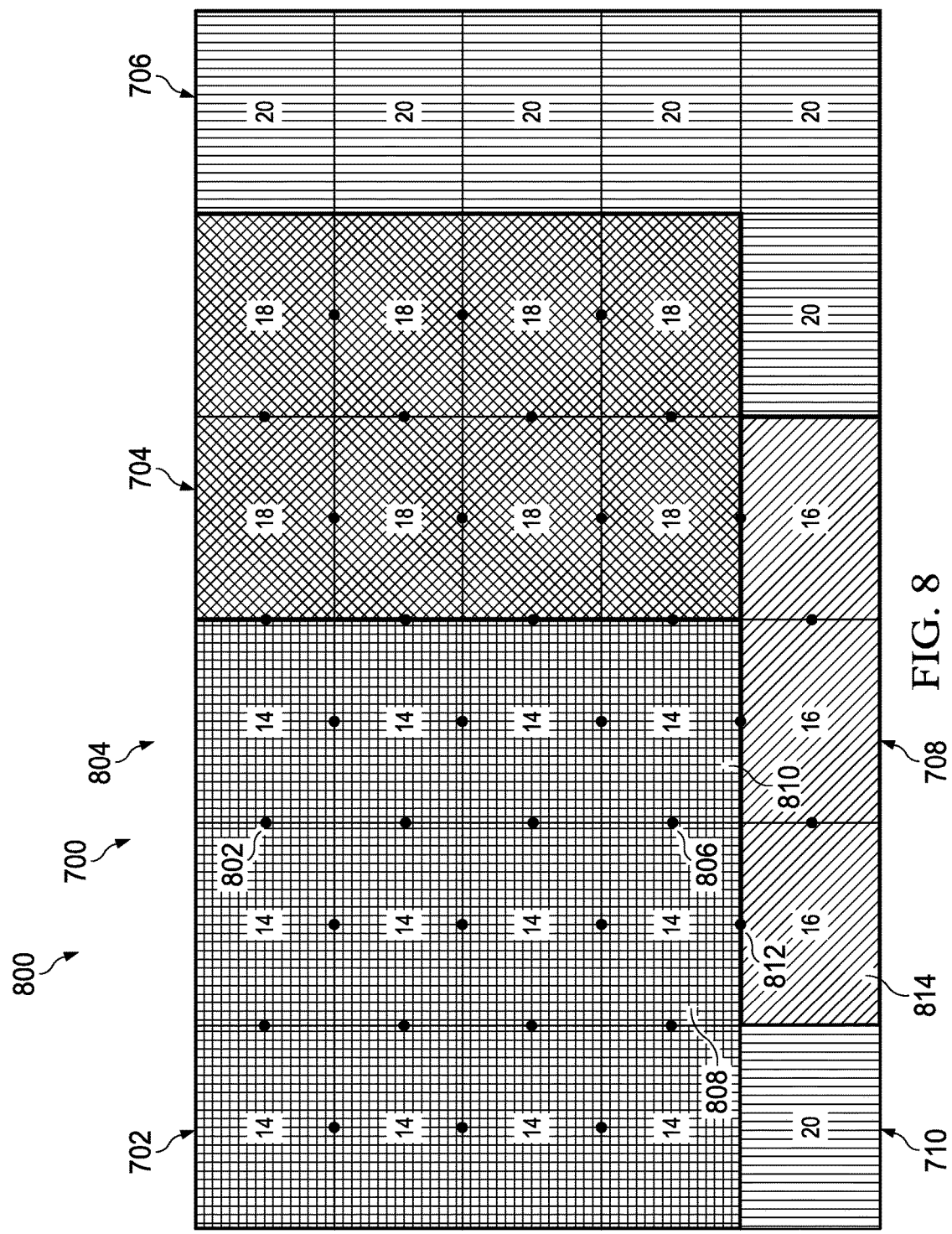
FIG. 8 is an illustration of a plurality of groups of panels in accordance with an illustrative embodiment.

Each of equation 25, equation 26, equation 27, and equation 28 includes the fraction 1/14. The fraction 1/14 corresponds to a fraction of one over a quantity of plies in first group 702. As can be seen in FIGS. 7-9, first group 702 has fourteen plies.

In each of equation 25, equation 26, equation 27, and equation 28, ply angles $\theta_s$ are present for only those ply sequences in which group 702 has a ply present. In other words, only ply sequences having plies in first group 702 will be present in equation 25, equation 26, equation 27, and equation 28. For example, each of equation 25, equation 26, equation 27, and equation 28 includes $\theta_1$. $\theta_1$ is present in each of equation 25, equation 26, equation 27, and equation 28 because first group 702 has a "1" in first ply sequence 914 of FIG. 9. Likewise, $\theta_2$ is present in each of equation 25, equation 26, equation 27, and equation 28 because column 906 representing first group 702 has a "1" in second ply sequence 916 of FIG. 9. Eleventh ply sequence 934 is the last ply sequence with a "1" for first group 702, accordingly, $\theta_{14}$ is the last ply angle present in equation 25, equation 26, equation 27, and equation 28. Ply sequence 15 of FIG. 9 is not present in any of equation 25, equation 26, equation 27, and equation 28. Equation 25, equation 26, equation 27, and equation 28 will be combined with equations for second group 704, third group 706, and fourth group 708 to form a system of equations.

Second group 704 has four lamination parameters. Accordingly, second group 704 also has four equations. A set of equations for second group 704 may be:

$$V_1^2 = \quad (29)$$
$$\frac{1}{18}\begin{pmatrix} \cos2\theta_1 + \cos2\theta_2 + \cos2\theta_3 + \cos2\theta_5 + \cos2\theta_6 + \cos2\theta_7 + \\ \cos2\theta_8 + \cos2\theta_9 + \cos2\theta_{11} + \cos2\theta_{12} + \cos2\theta_{13} + \cos2\theta_{14} + \\ \cos2\theta_{15} + \cos2\theta_{17} + \cos2\theta_{18} + \cos2\theta_{19} + \cos2\theta_{20} + \cos2\theta_{21} \end{pmatrix}$$

$$V_2^2 = \frac{1}{18}\begin{pmatrix} \sin2\theta_1 + \sin2\theta_2 + \sin2\theta_3 + \sin2\theta_5 + \sin2\theta_6 + \sin2\theta_7 + \\ \sin2\theta_8 + \sin2\theta_9 + \sin2\theta_{11} + \sin2\theta_{12} + \sin2\theta_{13} + \sin2\theta_{14} + \\ \sin2\theta_{15} + \sin2\theta_{17} + \sin2\theta_{18} + \sin2\theta_{19} + \sin2\theta_{20} + \sin2\theta_{21} \end{pmatrix} \quad (30)$$

$$V_3^2 = \quad (31)$$
$$\frac{1}{18}\begin{pmatrix} \cos4\theta_1 + \cos4\theta_2 + \cos4\theta_3 + \cos4\theta_5 + \cos4\theta_6 + \cos4\theta_7 + \\ \cos4\theta_8 + \cos4\theta_9 + \cos4\theta_{11} + \cos4\theta_{12} + \cos4\theta_{13} + \cos4\theta_{14} + \\ \cos4\theta_{15} + \cos4\theta_{17} + \cos4\theta_{18} + \cos4\theta_{19} + \cos4\theta_{20} + \cos4\theta_{21} \end{pmatrix}$$

-continued $$V_4^2 = \frac{1}{18}\begin{pmatrix} \sin4\theta_1 + \sin4\theta_2 + \sin4\theta_3 + \sin4\theta_5 + \sin4\theta_6 + \sin4\theta_7 + \\ \sin4\theta_8 + \sin4\theta_9 + \sin4\theta_{11} + \sin4\theta_{12} + \sin4\theta_{13} + \sin4\theta_{14} + \\ \sin4\theta_{15} + \sin4\theta_{17} + \sin4\theta_{18} + \sin4\theta_{19} + \sin4\theta_{20} + \sin4\theta_{21} \end{pmatrix} \quad (32)$$

As depicted, second group 704 has equation 29, equation 30, equation 31, and equation 32. Each of equation 29, equation 30, equation 31, and equation 32 includes the fraction 1/18. The fraction 1/18 corresponds to a fraction of one over a quantity of plies in second group 704. As can be seen in FIGS. 7-9, second group 704 has eighteen plies.

In each of equation 29, equation 30, equation 31, and equation 32, ply angles $\theta_k$ are present for only those ply sequences that have plies that are present for second group 704. In other words, only ply sequences having plies of second group 704 will be present in equation 29, equation 30, equation 31, and equation 32. For example, each of equation 29, equation 30, equation 31, and equation 32 includes $\theta_1$. $\theta_1$ is present in each of equation 29, equation 30, equation 31, and equation 32 because column 910 representing second group 704 has a "1" in first ply sequence 914 of FIG. 9. Likewise, $\theta_2$ is present in each of equation 29, equation 30, equation 31, and equation 32 because second group 704 has a "1" in second ply sequence 916 of FIG. 9. Second group 704 does not have $\theta_4$ and $\theta_{10}$ because second group 704 has a "0" in both ply sequence 4 and ply sequence 10 of FIG. 9. Equation 29, equation 30, equation 31, and equation 32 will be combined with equations for first group 702, third group 706, and fourth group 708 to form a system of equations.

Third group 706 has four lamination parameters. Accordingly, third group 706 also has four equations. A set of equations for third group 706 may be:

$$V_1^3 = \frac{1}{20}\begin{pmatrix} \cos2\theta_1 + \cos2\theta_3 + \cos2\theta_4 + \cos2\theta_5 + \cos2\theta_7 + \cos2\theta_8 + \\ \cos2\theta_9 + \cos2\theta_{10} + \cos2\theta_{11} + \cos2\theta_{12} + \cos2\theta_{13} + \\ \cos2\theta_{14} + \cos2\theta_{15} + \cos2\theta_{16} + \cos2\theta_{17} + \cos2\theta_{18} + \\ \cos2\theta_{19} + \cos2\theta_{20} + \cos2\theta_{21} + \cos2\theta_{22} \end{pmatrix} \quad (33)$$

$$V_2^3 = \frac{1}{20}\begin{pmatrix} \sin2\theta_1 + \sin2\theta_3 + \sin2\theta_4 + \sin2\theta_5 + \sin2\theta_7 + \sin2\theta_8 + \\ \sin2\theta_9 + \sin2\theta_{10} + \sin2\theta_{11} + \sin2\theta_{12} + \sin2\theta_{13} + \sin2\theta_{14} + \\ \sin2\theta_{15} + \sin2\theta_{16} + \sin2\theta_{17} + \sin2\theta_{18} + \sin2\theta_{19} + \sin2\theta_{20} + \\ \sin2\theta_{21} + \sin2\theta_{22} \end{pmatrix} \quad (34)$$

$$V_3^3 = \frac{1}{20}\begin{pmatrix} \cos4\theta_1 + \cos4\theta_3 + \cos4\theta_4 + \cos4\theta_5 + \cos4\theta_7 + \cos4\theta_8 + \\ \cos4\theta_9 + \cos4\theta_{10} + \cos4\theta_{11} + \cos4\theta_{12} + \cos4\theta_{13} + \\ \cos4\theta_{14} + \cos4\theta_{15} + \cos4\theta_{16} + \cos4\theta_{17} + \cos4\theta_{18} + \\ \cos4\theta_{19} + \cos4\theta_{20} + \cos4\theta_{21} + \cos4\theta_{22} \end{pmatrix} \quad (35)$$

$$V_4^3 = \frac{1}{20}\begin{pmatrix} \sin4\theta_1 + \sin4\theta_3 + \sin4\theta_4 + \sin4\theta_5 + \sin4\theta_7 + \sin4\theta_8 + \\ \sin4\theta_9 + \sin4\theta_{10} + \sin4\theta_{11} + \sin4\theta_{12} + \sin4\theta_{13} + \sin4\theta_{14} + \\ \sin4\theta_{15} + \sin4\theta_{16} + \sin4\theta_{17} + \sin4\theta_{18} + \sin4\theta_{19} + \sin4\theta_{20} + \\ \sin4\theta_{21} + \sin4\theta_{22} \end{pmatrix} \quad (36)$$

As depicted, column 912 representing third group 706 has equation 33, equation 34, equation 35, and equation 36. Each of equation 33, equation 34, equation 35, and equation 36 includes the fraction 1/20. The fraction 1/20 corresponds to a fraction of one over a quantity of plies in third group 706. As can be seen in FIGS. 7-9, third group 706 has twenty plies.

In each of equation 33, equation 34, equation 35, and equation 36, ply angles $\theta_k$ are present for only those ply sequences that have a ply present for third group 706. In other words, only ply sequences having plies of third group 706 will be present in equation 33, equation 34, equation 35, and equation 36. For example, each of equation 33, equation 34, equation 35, and equation 36 includes $\theta_1$. $\theta_1$ is present in each of equation 33, equation 34, equation 35, and equation 36 because third group 706 has a "1" in first ply sequence 914 of FIG. 9. Likewise, $\theta_2$ is not present in any of equation 33, equation 34, equation 35, and equation 36 because third group 706 has a "0" in second ply sequence 916 of FIG. 9. Third group 706 also does not have $\theta_6$ because third group 706 has a "0" in both ply sequence 6 of FIG. 9. Equation 33, equation 34, equation 35, and equation 36 will be combined with equations for first group 702, second group 704, and fourth group 708 to form a system of equations.

Fourth group 708 has four lamination parameters. Accordingly, fourth group 708 also has four equations. A set of equations for fourth group 708 may be:

$$V_1^4 = \frac{1}{16}\begin{pmatrix} \cos2\theta_5 + \cos2\theta_6 + \cos2\theta_7 + \cos2\theta_8 + \cos2\theta_9 + \cos2\theta_{10} + \\ \cos2\theta_{11} + \cos2\theta_{12} + \cos2\theta_{13} + \cos2\theta_{14} + \cos2\theta_{15} + \\ \cos2\theta_{16} + \cos2\theta_{17} + \cos2\theta_{18} + \cos2\theta_{19} + \cos2\theta_{20} \end{pmatrix} \quad (37)$$

$$V_2^4 = \frac{1}{16}\begin{pmatrix} \sin2\theta_5 + \sin2\theta_6 + \sin2\theta_7 + \sin2\theta_8 + \\ \sin2\theta_9 + \sin2\theta_{10} + \sin2\theta_{11} + \sin2\theta_{12} + \sin2\theta_{13} + \sin2\theta_{14} + \\ \sin2\theta_{15} + \sin2\theta_{16} + \sin2\theta_{17} + \sin2\theta_{18} + \sin2\theta_{19} + \sin2\theta_{20} \end{pmatrix} \quad (38)$$

$$V_3^4 = \frac{1}{16}\begin{pmatrix} \cos4\theta_5 + \cos4\theta_6 + \cos4\theta_7 + \cos4\theta_8 + \cos4\theta_9 + \cos4\theta_{10} + \\ \cos4\theta_{11} + \cos4\theta_{12} + \cos4\theta_{13} + \cos4\theta_{14} + \cos4\theta_{15} + \\ \cos4\theta_{16} + \cos4\theta_{17} + \cos4\theta_{18} + \cos4\theta_{19} + \cos4\theta_{20} \end{pmatrix} \quad (39)$$

$$V_4^4 = \frac{1}{16}\begin{pmatrix} \sin4\theta_5 + \sin4\theta_6 + \sin4\theta_7 + \sin4\theta_8 + \\ \sin4\theta_9 + \sin4\theta_{10} + \sin4\theta_{11} + \sin4\theta_{12} + \sin4\theta_{13} + \sin4\theta_{14} + \\ \sin4\theta_{15} + \sin4\theta_{16} + \sin4\theta_{17} + \sin4\theta_{18} + \sin4\theta_{19} + \sin4\theta_{20} \end{pmatrix} \quad (40)$$

As depicted, fourth group 708 has equation 37, equation 38, equation 39, and equation 40. Each of equation 37, equation 38, equation 39, and equation 40 includes the fraction 1/16. The fraction 1/16 corresponds to a fraction of one over a quantity of plies in fourth group 708. As can be seen in FIGS. 7-9, fourth group 708 has sixteen plies.

In each of equation 37, equation 38, equation 39, and equation 40, ply angles $\theta_k$ are present for only those ply sequences that have a ply present for fourth group 708. In other words, only ply sequences having plies of fourth group 708 will be present in equation 37, equation 38, equation 39, and equation 40. For example, each of equation 37, equation 38, equation 39, and equation 40 includes $\theta_1$. $\theta_1$ is not present in any of equation 37, equation 38, equation 39, and equation 40 because fourth group 708 has a "0" in first ply sequence 914 of FIG. 9. Likewise, $\theta_2$ is not present in any of equation 37, equation 38, equation 39, and equation 40 because fourth group 708 has a "0" in second ply sequence 916 of FIG. 9. Fourth group 708 does have a "1" in fourth ply sequence 920, fifth ply sequence 922, and sixth ply sequence 924. As a result, $\theta_5$, $\theta_7$, and $\theta_8$ are present in each of equation 37, equation 38, equation 39, and equation 40.

Each of equation 37, equation 38, equation 39, and equation 40 will be combined with equations for first group 702, second group 704, and third group 706 to form a system of equations. In general, the system of equations may be expressed as:

$$\begin{bmatrix} V_1^1 = \sum_{s=1}^{S} X_s^1 \cos 2\theta_s / t^1 \\ V_2^1 = \sum_{s=1}^{S} X_s^1 \sin 2\theta_s / t^1 \\ V_3^1 = \sum_{s=1}^{S} X_s^1 \cos 4\theta_s / t^1 \\ V_4^1 = \sum_{s=1}^{S} X_s^1 \sin 4\theta_s / t^1 \\ \ldots \\ V_1^l = \sum_{s=1}^{S} X_s^l \cos 2\theta_s / t^l \\ V_2^l = \sum_{s=1}^{S} X_s^l \sin 2\theta_s / t^l \\ V_3^l = \sum_{s=1}^{S} X_s^l \cos 4\theta_s / t^l \\ V_4^l = \sum_{s=1}^{S} X_s^l \sin 4\theta_s / t^l \\ \ldots \\ V_1^L = \sum_{s=1}^{S} X_s^L \cos 2\theta_s / t^L \\ V_2^L = \sum_{s=1}^{S} X_s^L \sin 2\theta_s / t^L \\ V_3^L = \sum_{s=1}^{S} X_s^L \cos 4\theta_s / t^L \\ V_4^L = \sum_{s=1}^{S} X_s^L \sin 4\theta_s / t^L \end{bmatrix} \quad (41)$$

where $V_i^l$ is a lamination parameter in which i is a lamination parameter index and l is the layup index (panel group index), while $\theta_s$ is a ply angle in which s is a ply sequence number, and where $X_s^l$ is a ply index that is 1 if the ply in layup l is present in sequence s, and 0 if that ply is absent in sequence s.

In these equations, the ply angle for each ply may be determined by solving for $\theta_s$ in each equation of set of equations 41. In set of equations 26, $V_i^l$ are the lamination parameters determined using the desired thickness and the desired stiffness distribution in operation 206. The ply index $X_s^l$ in each equation is determined in operation 208.

Figure 3:
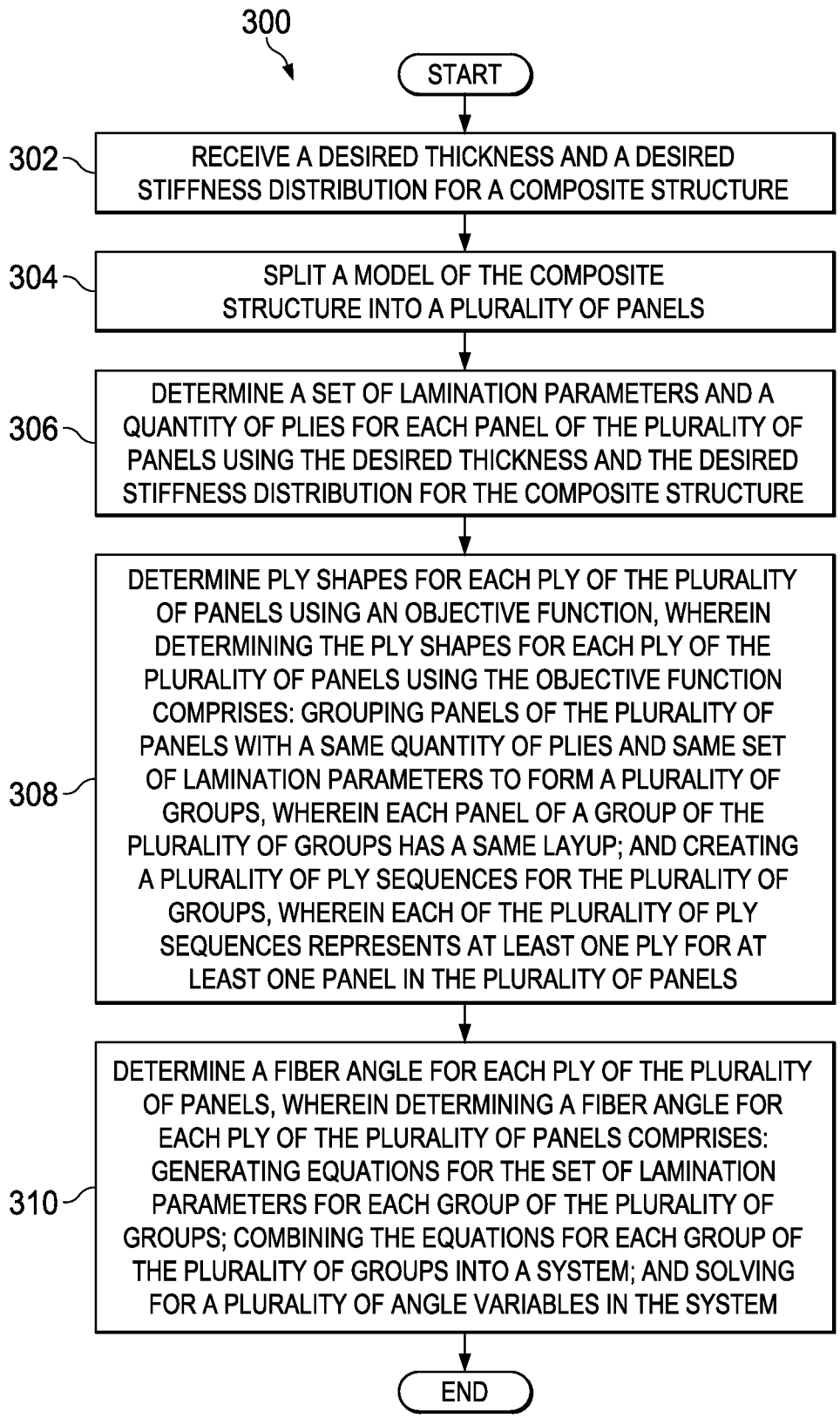
FIG. 3 is an illustration of a flowchart of a process for determining a layup for a composite structure in accordance with an illustrative embodiment.

Turning now to FIG. 3, an illustration of a flowchart of a process for determining a layup for a composite structure is depicted in accordance with an illustrative embodiment. Process 300 may be a process for determining ply arrangement 509 of FIG. 5A. In some illustrative examples, process 300 may be used in forming composite skin 120 of aircraft 100 of FIG. 1.

Process 300 may begin by receiving a desired thickness and a desired stiffness distribution for a composite structure (operation 302). A model of the composite structure may be split into a plurality of panels (operation 304).

A set of lamination parameters and a quantity of plies for each panel of the plurality of panels are determined using the desired thickness and the desired stiffness distribution for the composite structure (operation 306). Ply shapes for each ply of the plurality of panels are determined using an objective function. Determining the ply shapes for each ply of the plurality of panels using the objective function comprises grouping panels of the plurality of panels with a same quantity of plies and same set of lamination parameters to form a plurality of groups and creating a plurality of ply sequences for the plurality of groups. Each panel of a group of the plurality of groups has a same layup. Each of the plurality of ply sequences represents a ply for at least one panel in the plurality of panels (operation 308). A layup may represent a collection of plies and respective ply angles through the thickness of the panel.

A fiber angle for each ply of the plurality of panels is determined. Determining a fiber angle for each ply of the plurality of panels comprises generating equations for a plurality of lamination parameters for each group of the plurality of groups, combining the equations for each group of the plurality of groups into a system, and solving for a plurality of angle variables in the system (operation 310). Afterwards the process terminates.

Figure 4:
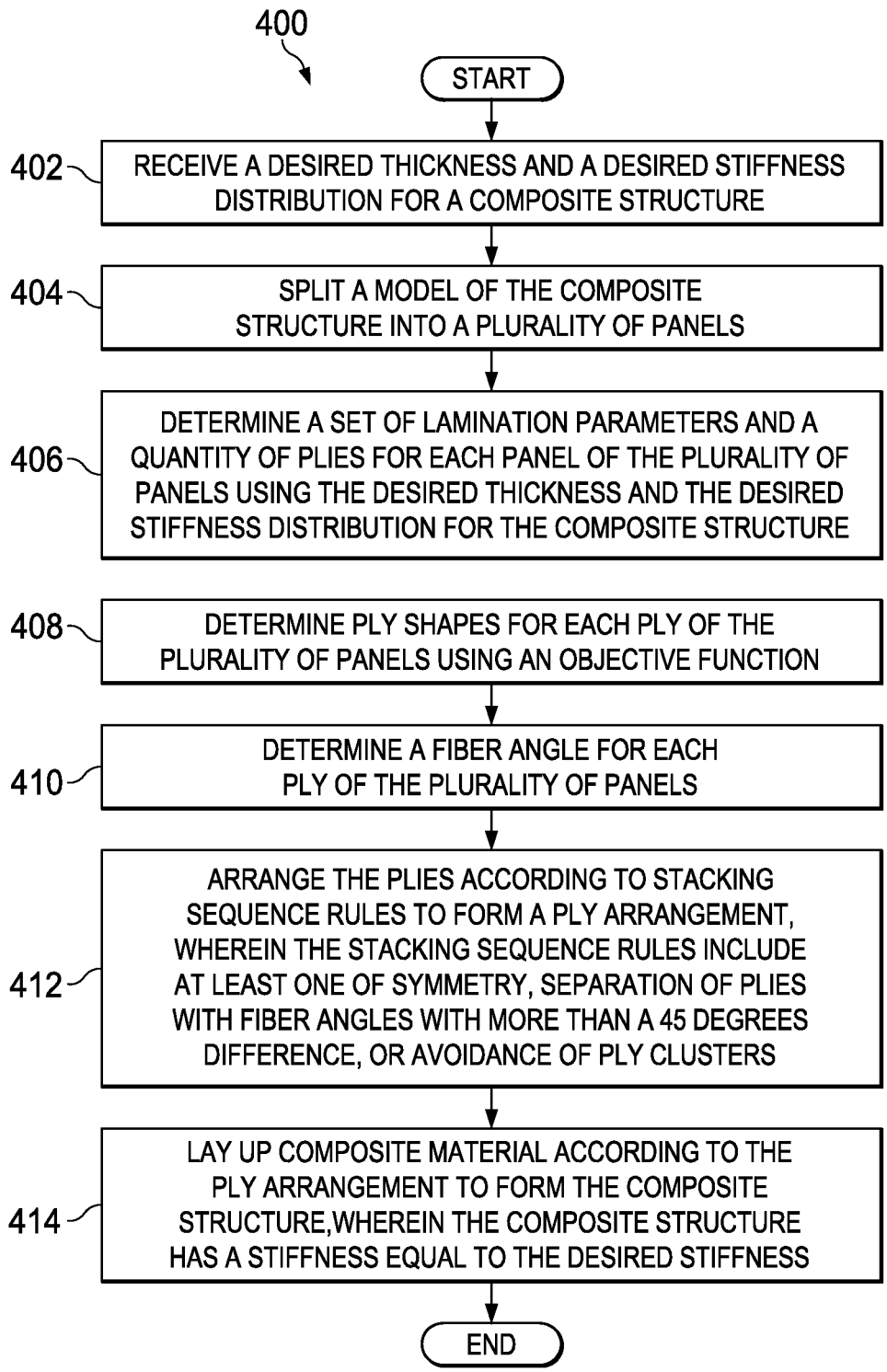
FIG. 4 is an illustration of a flowchart of a process for forming a composite structure in accordance with an illustrative embodiment.

Turning now to FIG. 4, an illustration of a flowchart of a process for forming a composite structure is depicted in accordance with an illustrative embodiment. Process 400 may be a process for determining ply arrangement 509 of FIG. 5A. In some illustrative examples, process 400 may be used in forming composite skin 120 of aircraft 100 of FIG. 1.

Process 400 may begin by receiving a desired thickness and a desired stiffness distribution for a composite structure (operation 402). In some illustrative examples, the composite structure may be a non-traditional composite laminate structure.

A model of the composite structure may be split into a plurality of panels (operation 404). A set of lamination parameters and a quantity of plies for each panel of the plurality of panels may be determined using the desired thickness and the desired stiffness distribution for the composite structure (operation 406). Ply shapes for each ply of the plurality of panels may be determined using an objective function (operation 408). A fiber angle for each ply of the plurality of panels may be determined (operation 410). The plies may be arranged according to stacking sequence rules to form a ply arrangement, wherein the stacking sequence rules include at least one of symmetry, separation of plies with fiber angles with more than a 45 degrees difference, or avoidance of ply clusters (operation 412). Composite material may be laid up according to the ply arrangement to form the composite structure, wherein the composite structure has a stiffness equal to the desired stiffness (operation 414). Afterwards, the process terminates.

In some illustrative examples, determining ply shapes for each ply of the plurality of panels using an objective function comprises grouping panels of the plurality of panels with a same quantity of plies and same lamination parameters to form a plurality of groups; creating a plurality of ply sequences for the plurality of groups; and determining a ply shape for each ply sequence of the plurality of ply sequences. In these examples, each panel of a group of the plurality of groups has a same layup. Further, in these examples, each of the plurality of ply sequences represents a ply in the plurality of panels.

In some illustrative examples, determining the fiber angle for each ply of the plurality of panels comprises generating equations for lamination parameters for each group of the plurality of groups; combining the equations for each group of the plurality of groups into one system; and solving for a plurality of angle variables in the system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, process 200 may thereafter arrange the plies according to stacking sequence rules to form a ply arrangement. In some illustrative examples, the stacking sequence rules include at least one of symmetry, manufacturing constraints, separation of plies with fiber angles with more than a 45 degree difference, or avoidance of ply clusters.

In some illustrative examples, determining ply shapes for each ply of the plurality of panels comprises maximizing a connection quantity over all of the plurality of panels, wherein a connection exists when there is a common ply between two adjacent panels of the plurality of panels, and wherein a connection quantity is a sum of connections. In some illustrative examples, determining ply shapes for each ply of the plurality of panels comprises limiting a quantity of plies with a same geometry to be less than a quantity of lamination parameters.

In some illustrative examples, process 200 may also include grouping panels of the plurality of panels with a same quantity of plies and same in-plane lamination parameters to form a plurality of groups, wherein each panel of a group of the plurality of groups has a same layup. In one illustrative example, process 300 may further include creating a plurality of ply sequences for the plurality of groups, wherein each of the plurality of ply sequences represents a ply in the composite structure. In some examples, determining ply shapes for each ply of the plurality of panels may comprise minimizing the total length of the ply boundary over all of the plurality of groups. In some examples, the system is underdetermined and multiple solutions are possible. In these examples, the method may further comprise selecting one of the multiple solutions based on at least one of a desirable stacking sequence or matching fiber angles with the ply shapes.

In some examples, determining a fiber angle for each ply of the plurality of panels comprises: generating equations for a plurality of lamination parameters for each group of the plurality of groups; combining the equations for each group of the plurality of groups into one system; and solving for a plurality of angle variables in the system. In one example, a quantity of the plurality of ply sequences is equal to at least a quantity of the plurality of groups times a quantity of the plurality of lamination parameters. In an example, a quantity of the plurality of ply sequences is chosen such that for any two groups in the plurality of groups with a thickness difference of fewer plies than a quantity of the plurality of lamination parameters, there are at least a quantity of ply sequences equal to a quantity of the plurality of lamination parameters in which the two groups have different ply present or absent states.

Figure 5A:
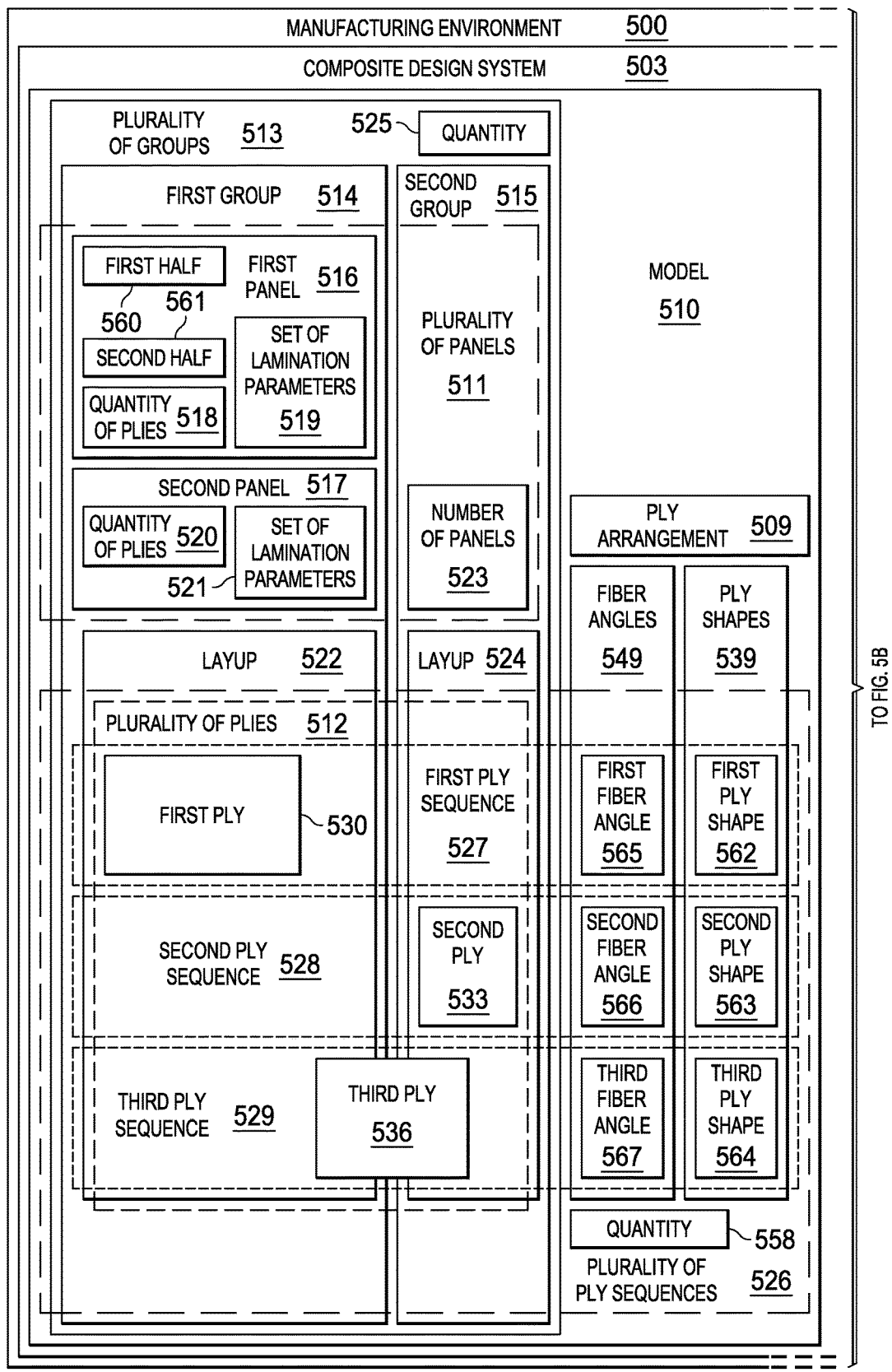
FIGS. 5A and 5B are illustrations of a block diagram of a manufacturing environment in accordance with an illustrative embodiment.
Figure 5B:
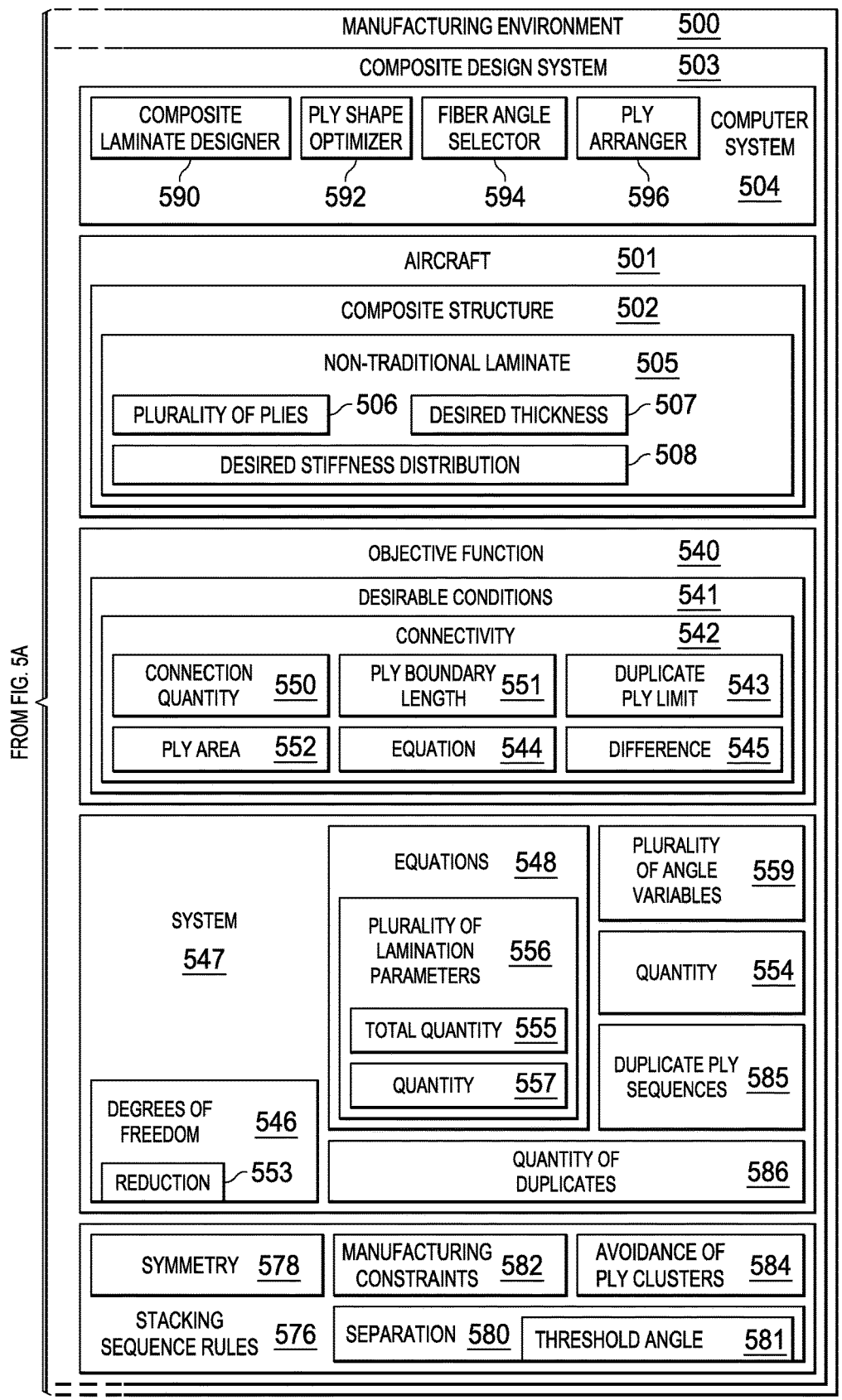

Turning now to FIGS. 5A and 5B, illustrations of a block diagram of a manufacturing environment are depicted in accordance with an illustrative embodiment. Manufacturing environment 500 may be an environment for manufacturing at least a portion of aircraft 501. For example, manufacturing environment 500 may be an environment for at least one of design or manufacture of composite structure 502 of aircraft 501.

In some illustrative examples, aircraft 100 of FIG. 1 may be a physical implementation of aircraft 501 of FIG. 5B. In some illustrative examples, composite skin 120 of FIG. 1 may be a physical implementation of composite structure 502 of FIG. 5B.

Composite design system 503 of manufacturing environment 500 may be used to design composite structure 502. In this illustrative example, composite design system 503 may be implemented using software, hardware, firmware, or a combination thereof.

When software is used, the operations performed by composite design system 503 may be implemented using, for example, without limitation, program code configured to run on a processor unit. When firmware is used, the operations performed by composite design system 503 may be implemented using, for example, without limitation, program code and data and stored in persistent memory to run on a processor unit.

When hardware is employed, the hardware may include one or more circuits that operate to perform the operations performed by composite design system 503. Depending on the implementation, the hardware may take the form of a circuit system, an integrated circuit, an application-specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, programmable array logic, a field programmable logic array, a field programmable gate array, or some other type of programmable hardware device.

In one illustrative example, composite design system 503 may be implemented in computer system 504. Composite design system 503 may be used to design composite structure 502.

Composite structure 502 may be non-traditional laminate 505. In these illustrative examples, non-traditional laminate 505 may be a laminate that does not have a traditional layup. When composite structure 502 is non-traditional laminate 505, plurality of plies 506 may have non-traditional fiber angles, such as fiber angles other than 0°, 90° or ±45°. Composite structure 502 may have desired thickness 507 and desired stiffness distribution 508. Desired stiffness distribution 508 may be provided in any suitable form. In some illustrative examples, desired stiffness distribution 508 may be provided as a total thickness and in-plane lamination parameters. In another illustrative example, desired stiffness distribution 508 may be provided as a total thickness and ply percentages for given ply angles of a traditional laminate. Non-traditional laminate 505 may be designed in accordance with an illustrative embodiment to have the same stiffness distribution 508 as the traditional laminate having the total thickness and ply percentages for the given ply angles.

In another illustrative example, desired stiffness distribution 508 may be provided as a number of plies of given fiber angles and ply thicknesses. In another illustrative example, desired stiffness distribution 508 may be provided as a specific stacking sequence including not only the ply count and angles, but also the order of the plies through the thickness. In another illustrative example, desired stiffness distribution 508 may be provided as a laminate stiffness matrix, also known as an ABD matrix, generated from one of the previous examples of thickness, lamination parameter, or ply number data. The laminate stiffness matrix relates in-plane and bending loads in the laminate to in-plane strains and curvature in the laminate according to the Classical Laminate Theory. In some illustrative examples, desired thickness 507 and desired stiffness distribution 508 may be used in combination to determine a set of lamination parameters. The set of lamination parameters may be at least one of in-plane lamination parameters (A), out-of-plane lamination parameters (D), or coupling lamination parameters (B). Coupling lamination parameters are used to define the B stiffness matrix, which is 0 if the layup is defined to be symmetric. The set of lamination parameters may be a subset of in-plane lamination parameters.

In some illustrative examples, desired thickness 507 and desired stiffness distribution 508 may be used to determine ply arrangement 509 of model 510 of composite structure 502. Model 510 may be a virtual representation of composite structure 502. Model 510 may be split into plurality of panels 511.

Plurality of panels 511 may be selected based on desired thickness 507 and desired stiffness distribution 508. In some illustrative examples, each panel in plurality of panels 511 may have the same size and shape. In some illustrative examples, plurality of panels 511 may have at least one of a plurality of shapes or a plurality of sizes. In some illustrative examples, each panel in plurality of panels 511 may be rectangular.

Plurality of panels 511 is formed of plurality of plies 512. Plurality of plies 512 is a representation of plurality of layers of composite material. Plurality of plies 512 may be a representation of plurality of plies 506 of composite structure 502.

Plurality of panels 511 may be grouped into plurality of groups 513. Each group in plurality of groups 513 may include a number of panels of plurality of panels 511 having the same quantity of plies and same set of lamination parameters. In some illustrative examples, a group of plurality of groups 513 may only include one panel. In some illustrative examples, a group of plurality of groups 513 may include more than one panel. In some illustrative examples, a number of panels of plurality of panels 511 may only be grouped if each of the number of panels are adjacent. In some illustrative examples, a number of panels of plurality of panels 511 may be grouped even if the number of panels are not adjacent. An illustrative example is provided in FIG. 7.

As depicted, plurality of groups 513 includes first group 514 and second group 515. First group 514 includes first panel 516 and second panel 517. First panel 516 has quantity of plies 518 and set of lamination parameters 519. In some illustrative examples, quantity of plies 518 may represent the quantity of plies in a respective portion of composite structure 502. In some illustrative examples, quantity of plies 518 may be only half of the number of plies that will form the respective portion of composite structure 502. When only half of the number of plies is modeled, the composite structure 502 is assumed to be symmetric about the laminate mid-plane and both halves are defined simultaneously.

Second panel 517 has quantity of plies 520 and set of lamination parameters 521. In some illustrative examples, quantity of plies 520 may represent the quantity of plies in a respective portion of composite structure 502. In some illustrative examples, quantity of plies 520 may be only half of the number of plies that will form the respective portion of composite structure 502.

As depicted, quantity of plies 518 of first panel 516 may be the same as quantity of plies 520 of second panel 517. Set of lamination parameters 519 of first panel 516 may be the same as set of lamination parameters 521 of second panel 517. As a result, first panel 516 and second panel 517 will both have layup 522. Layup 522 may describe at least one of the order, fiber angles, ply shapes, or other characteristics of a plurality of plies forming first group 514.

As depicted, second group 515 includes number of panels 523. Number of panels 523 may include any desirable quantity of panels. In some illustrative examples, number of panels 523 may include one panel. In some illustrative examples, number of panels 523 may include more than one panel. Each panel in number of panels 523 has the same quantity of plies and set of lamination parameters as each other panel in number of panels 523. As a result, each panel in number of panels 523 has layup 524. Layup 524 may describe at least one of the order, fiber angles, ply shapes, or other characteristics of a plurality of plies forming second group 515.

Quantity 525 of plurality of groups 513 represents the quantity of groups in plurality of groups 513. As depicted, quantity 525 of plurality of groups 513 is two. However, quantity 525 of plurality of groups 513 may be any desirable value. In some illustrative examples, quantity 525 may be greater than two.

Plurality of ply sequences 526 may be created for plurality of groups 513. Plurality of ply sequences 526 may be positions for plurality of plies 512 of plurality of groups 513. Plurality of ply sequences 526 may be described as a plurality of "slots" which may be filled with plurality of plies 512. Plies of plurality of plies 512 present in a ply sequence of plurality of ply sequences 526 are laid up at the same time during manufacturing of composite structure 502. All plies present of plurality of plies 512 present in the same ply sequence of plurality of ply sequences 526 have the same fiber angle. Plies of plurality of plies 512 within the same ply sequence of plurality of ply sequences 526 need not be continuous.

Plurality of plies 512 may form plurality of groups 513. Although plurality of plies 512 forms plurality of groups 513, each ply of plurality of plies 512 may not be present in each of plurality of groups 513. Some of plurality of plies 512 may be present in only first group 514. Some of plurality of plies 512 may only be present in second group 515. Some of plurality of plies 512 may be present in both first group 514 and second group 515. Each ply sequence of the plurality of ply sequences 526 must contain at least one ply of the plurality of plies 512 in at least one group of the plurality of groups 515.

First group 514 may only have plies in a subset of plurality of ply sequences 526. Second group 515 may only have plies in a subset of plurality of ply sequences 526.

Plurality of ply sequences 526 includes first ply sequence 527, second ply sequence 528, and third ply sequence 529. First ply 530 of plurality of plies 512 is present in first ply sequence 527. First ply 530 is present in layup 522 but not in layup 524. In other words, first ply 530 is absent in layup 524.

Second ply 533 of plurality of plies 512 is present in second ply sequence 528. Second ply 533 is present in layup 524 but not in layup 522. In other words, second ply 533 is absent in layup 522.

Third ply 536 of plurality of plies 512 is present in third ply sequence 529. Third ply 536 is present in both layup 522 and layup 524.

Plurality of plies 512 in plurality of ply sequences 526 may have ply shapes 539. Ply shapes 539 may be selected using objective function 540. In some illustrative examples, ply shapes 539 may include more than one shape. Ply shapes 539 of respective plies of plurality of plies 512 may be influenced by which groups of plurality of groups 513 contain the respective plies. Ply shapes 539 may be selected such that model 510 has desired thickness 507 of composite structure 502. Ply shapes 539 may be selected such that each group of plurality of groups 513 has a desired quantity of plies.

Objective function 540 may determine ply shapes 539 based on desirable conditions 541. Desirable conditions 541 may be constraints for optimizing objective function 540. Desirable conditions 541 may be set by a user. Desirable conditions 541 may include connectivity 542, duplicate ply limit 543, equation 544, and difference 545. Duplicate ply limit 543, equation 544, and difference 545 may affect degrees of freedom 546 of system 547 of equations 548. System 547 of equations 548 may be used to determine fiber angles 549 of plurality of plies 512 after using objective function 540 to determine ply shapes 539. Specifically, each ply sequence of plurality of ply sequences 526 may have a ply angle variable in system 547 of equations 548. By solving for a value of the ply angle variable for a specific ply sequence in ply sequences 526, the fiber angle for all plies in the respective ply sequence is determined. Fiber angles for the plies of plurality of plies 512 are inherited from the ply sequence of ply sequences 526 to which they belong.

In some illustrative examples, desirable conditions 541 may include maximizing connectivity 542. In some illustrative examples, connectivity 542 may be described using connection quantity 550. Connection quantity 550 is a sum of connections across all of plurality of panels 511. A connection exists if plies within the same ply sequence are present for two adjacent panels of plurality of panels 511.

In other illustrative examples, connectivity 542 may be described using ply boundary length 551. A ply boundary is the boundary between two adjacent panels in one ply sequence, in which a ply is present in one panel and the ply is absent in the other panel in the same ply sequence. The ply boundary length is the sum of the lengths of all the boundaries of that ply. In some illustrative examples, maximizing connectivity 542 may be described by minimizing ply boundary length 551 over all of plurality of plies 512.

In some illustrative examples, connectivity 542 may be described by a function of ply boundary length 551 and ply area 552. Ply area 552 may be the sum of the area of all panels of plurality of panels 511 that are connected within a ply. In one illustrative example, the function may divide the ply boundary length 551 by ply area 552 for each ply, and maximizing connectivity 550 may be described by minimizing the sum of the function values over all plies of plurality of plies 518.

In some illustrative examples, desirable conditions 541 may include controlling reductions 553 to degrees of freedom 546. Degrees of freedom 546 may be affected by a quantity of duplicate ply sequences. Reductions 553 to degrees of freedom 546 may be controlled by keeping a quantity of duplicate ply sequences below duplicate ply limit 543. Duplicate ply limit 543 may be a maximum number of ply sequences that cover the same subset of groups of plurality of groups 513. These duplicate ply sequences may act as a sublaminate. A sublaminate can be represented by a set of lamination parameters. If the quantity of lamination parameters that describes the sublaminate is smaller than the number of ply sequences forming the sublaminate, a change of variables can be made, reducing degrees of freedom 546 in system 547. System 547 might become overdetermined if the number of degrees of freedom 546 is smaller than the quantity of equations 554.

In some illustrative examples, desirable conditions 541 may include having a desirable value for degrees of freedom 546. Degrees of freedom 546 may be desirably affected by equation 544. Degrees of freedom 546 may be influenced by difference 545 of thickness between any two groups of plurality of groups 513 and differences between the present and absent plies of those respective groups.

Although not listed in desirable conditions 541, it may also be desirable for each ply sequence of plurality of ply sequences 526 to contain at least one ply in plurality of plies 512. If a ply sequence in plurality of ply sequences 526 were to be empty, the number of variables in system 547 would be reduced. Reducing the number of variables in system 547 may result in a situation with more equations 548 than solution variables. Having a situation with more equations than plurality of angle variables 559 will result in system 547 being overdetermined.

System 547 may be used to determine fiber angles 549 of plurality of ply sequences 526, resulting in fiber angles 549 for each ply of plurality of plies 512. System 547 may include equations 548. Quantity 554 of equations 548 may equal total quantity 555 of lamination parameters in plurality of lamination parameters 556 in system 547. Total quantity 555 of plurality of lamination parameters 556 in system 547 is the product of quantity 525 of plurality of groups 513 and quantity 557 of lamination parameters per group of plurality of groups 513. Equations 548 may be formed using plurality of lamination parameters 556, fiber angles 549, and ply shapes 539.

In some illustrative examples, each group in plurality of groups 513 may have quantity 557 of lamination parameters. Quantity 557 of lamination parameters per group of plurality of groups 513 may be four. In these illustrative examples, quantity 554 of equations 548 and total quantity 555 of plurality of lamination parameters 556 may be four times quantity 525 of plurality of groups 513.

Quantity 554 of equations 548 may affect the ability to solve system 547. In some illustrative examples, desirable values for other features may be influenced by quantity 554 of equations 548.

For example, quantity 558 of plurality of ply sequences 526 may be chosen to be larger than quantity 554 of equations 548. The number of degrees of freedom 546 is necessarily equal to or smaller than quantity 558 of plurality of ply sequences 526. System 547 of equations 548 will not be solvable if the number of degrees of freedom 546 is smaller than quantity 554 of equations 548. When degrees of freedom 546 are smaller than quantity 554 of equations 548, system 547 of equations 548 is overdetermined.

If system 547 of equations 548 is underdetermined, multiple solutions may be possible. If multiple solutions are possible, one of these solutions may be selected based on a desirable stacking sequence. If multiple solutions are possible, one of these solutions may be selected based on how well fiber angles match with the ply shapes, or both. For example, a 0° fiber angle would be better for a long, narrow ply shape that is aligned to the 0° direction than a 90° fiber angle.

As another example, the quantity of degrees of freedom 546 might be reduced by the presence of duplicate ply sequences 585. Duplicate ply sequences 585 are ply sequences with plies of the same shape. If quantity of duplicates 586 of one type of duplicate ply sequences 585 is larger than quantity 557 of lamination parameters per group of plurality of groups 513, reduction 553 in degrees of freedom 546 is equal to the difference between quantity of duplicates 586 and quantity 557 of lamination parameters per group of plurality of groups 513. The total quantity of degrees of freedom 546 may then equal quantity 558 of plurality of ply sequences 526 minus reduction 553 of degrees of freedom 546 for each of duplicate ply sequences 585. System 547 of equations 548 will not be solvable if the quantity of degrees of freedom 546 is smaller than quantity 554 of equations 548. As yet a further example, system 547 of equations 548 may be set up for any subset of groups in plurality of groups 513 for which the number of degrees of freedom 546 in system 547 for that subset of groups has to be larger than quantity 554 of equations 548 for that subset of groups.

Equations 548 may be generated for plurality of lamination parameters 556. Equations 548 may also include plurality of angle variables 559. Equations 548 for plurality of groups 513 may be combined into system 547. Afterwards, system 547 may be solved to determine the value of each angle in plurality of angle variables 559.

In some illustrative examples, system 547 may be solved to determine angles for all plies in all groups in plurality of groups 513. Layup 522 for first panel 516 in first group 514 with quantity of plies 518 may represent the entirety of a portion of composite structure 502. Layup 522 may comprise plies with fiber angles corresponding to those plies in first group 514 that are present in ply sequences of plurality of ply sequences 526. When quantity of plies 518 represents the entirety of a portion of composite structure 502, each ply in first panel 516 may have a different fiber angle.

In another illustrative example, system 547 may be solved to determine angles for only half of each group of plurality of groups 513. For example, system 547 may be solved to determine angles for first half 560 of first panel 516. When system 547 is solved to determine angles for first half 560, each ply in first half 560 of first panel 516 may have a different fiber angle. When system 547 is solved to determine angles for first half 560, second half 561 of first panel 516 may include plies with the same angles as the fiber angles in first half 560. For example, second half 561 may be a mirror image of first half 560 to form a symmetric laminate.

By solving objective function 540, ply shapes 539 of plurality of plies 512 may be determined. By solving system 547 of equations 548, fiber angles 549 of plurality of ply sequences 526 may be determined, consequently defining fiber angles of plies 512.

As depicted, ply shapes 539 may include first ply shape 562, second ply shape 563, and third ply shape 564. First ply shape 562 is a shape of first ply 530 in first ply sequence 527. As depicted, first ply 530 is present in layup 522 and not in layup 524. Accordingly, first ply shape 562 may be substantially the same as the shape of first group 514.

Second ply shape 563 is a shape of second ply 533 in second ply sequence 528. As depicted, second ply 533 is present in layup 524 and not in layup 522. Accordingly, second ply shape 563 may be substantially the same as the shape of second group 515. In this illustrative example, first ply shape 562 and second ply shape 563 are different.

Third ply shape 564 is a shape of third ply 536 in third ply sequence 529. As depicted, third ply 536 is present in both layup 522 and layup 524. Accordingly, third ply shape 564 may be substantially the same as the shape of first group 514 and second group 515 combined. In this illustrative example, third ply shape 563 may be different from both first ply shape 562 and second ply shape 563.

First ply 530, second ply 533, and third ply 536 are only illustrative examples of plies in plurality of plies 512. Although each of first ply shape 562, second ply shape 563, and third ply shape 564 are different from each other shape of first ply shape 562, second ply shape 563, and third ply shape 564, in some illustrative examples, plies in plurality of plies 512 may have substantially the same shape.

For example, in other implementations, first ply 530 may be present in both layup 522 and layup 524. In these implementations, first ply shape 562 would be substantially the same as third ply shape 564. As another example, first ply 530 could instead be present in layup 524 and not layup 522. In this example, first ply shape 562 would be substantially the same as second ply shape 563.

After determining ply shapes 539 using objective function 540, fiber angles 549 may be determined using system 547 of equations 548. Fiber angles 549 may be determined by solving for plurality of angle variables 559. In this illustrative example, fiber angles 549 include first fiber angle 565, second fiber angle 566, and third fiber angle 567. First fiber angle 565 may be a fiber angle for first ply 530 in first ply sequence 527. Second fiber angle 566 may be a fiber angle for second ply 533 in second ply sequence 528. Third fiber angle 567 may be a fiber angle for third ply 536 in third ply sequence 529.

In some illustrative examples, first fiber angle 565 may be different from each other fiber angle in fiber angles 549. For example, first fiber angle 565 may be different from second fiber angle 566 and third fiber angle 567.

After determining values for plurality of angle variables 559 using system 547, stacking sequence rules 576 may be used to form ply arrangement 509. In some illustrative examples, if plurality of lamination parameters 556 include in-plane and out-of-plane lamination parameters, stacking sequence rules 576 may not be used. In these illustrative examples, the order of plurality of ply sequences 526 may be the same as ply arrangement 509.

In illustrative examples in which plurality of lamination parameters 556 are only in-plane lamination parameters, stacking sequence rules 576 may be used to form ply arrangement 509. Ply arrangement 509 may reflect an order in which plurality of plies 512 are laid down during manufacturing. Stacking sequence rules 576 may include symmetry 578, separation 580, manufacturing constraints 582, and avoidance of ply clusters 584 with similar fiber angles.

Symmetry 578 may be desirable in each panel of plurality of panels 511. Specifically, it may be desirable for each panel of plurality of panels 511 to be symmetric about a center plane. For example, when symmetry 578 is present in first panel 516, first half 560 may be a mirror image of second half 561 about the center plane.

Separation 580 may describe separation of plurality of plies 512 with fiber angles 549 with more than a specified number of degrees difference. For example, it may be desirable to separate plies of plurality of plies 512 that are adjacent in a layup that have fiber angles 549 that are more than threshold angle 581 apart. Threshold angle 581 have any desirable value. In some illustrative examples, threshold angle 581 may be 45 degrees. Separating plies of plurality of plies 512 in a layup that have fiber angles 549 that are more than 45 degrees apart may avoid high interlaminar stresses. Separation 580 may be desirable when each ply has a fiber angle that differs by more than threshold angle 581 of the fiber angle of each adjacent ply. Threshold angle 581 might be chosen to be other than 45 degrees. For example, threshold angle 581 may be 50 degrees, 55 degrees, 60 degrees, or any other desirable value.

Manufacturing constraints 582 may include desirable conditions for manufacturing. For example, it may be undesirable to lay down the same fiber angle across multiple ply sequences of plurality of ply sequences 526. It may be desirable to combine ply sequences that have the same ply angles and whose ply shapes do not overlap to minimize the quantity of ply sequences to be programmed and inspected.

Avoidance of ply clusters 584 may describe the placement of plies having substantially similar fiber angles that are adjacent to each other in a layup. Clusters of plies with the same fiber angle may result in a laminate that is prone to delaminations. In some illustrative examples, plies having the same fiber angle may be desirably separated from each other. As a result, avoidance of ply clusters 584 may be desirable.

Ply arrangement 509 is formed by arranging plurality of plies 512 according to stacking sequence rules 576. Composite structure 502 may be laid up according to ply arrangement 509. As a result, plurality of plies 506 may be in the same order as plurality of plies 512 in ply arrangement 509 of model 510.

By determining ply shapes 539 using objective function 540 and selecting fiber angles 549 using system 547, resulting composite structure 502 may have a desired level of blending, desired thickness 507, and desired stiffness distribution 508. Further, by using stacking sequence rules 576 to form ply arrangement 509, manufacturing composite structure 502 may not take an undesirable amount of time. Using stacking sequence rules 576 to form ply arrangement 509 may result in high quality laminates by avoiding undesired failure modes such as delamination.

Computer system 504 may include composite laminate designer 590, ply shape optimizer 592, fiber angle selector 594, and ply arranger 596. In this illustrative example, composite laminate designer 590 may be implemented in software, hardware, firmware or a combination thereof. When software is used, the operations performed by composite laminate designer 590 may be implemented in program code configured to run on hardware, such as a processor unit. When firmware is used, the operations performed by composite laminate designer 590 may be implemented in program code and data and stored in persistent memory to run on a processor unit. When hardware is employed, the hardware may include circuits that operate to perform the operations in composite laminate designer 590.

Composite laminate designer 590 receives desired thickness 507 and desired stiffness distribution 508 for composite structure 502, splits model 510 of composite structure 502 into plurality of panels 511, and determines a set of lamination parameters and a quantity of plies for each panel of plurality of panels 511 using desired thickness 507 and desired stiffness distribution 508 for composite structure 502. Composite laminate designer 590 may further group panels of plurality of panels 511 with a same quantity of plies and same set of lamination parameters to form plurality of groups 513, wherein each panel of a group of plurality of groups 513 has a same layup. Composite laminate designer 590 may further create plurality of ply sequences 526 for plurality of groups 513, wherein each of plurality of ply sequences 526 represents at least one ply in composite structure 502.

In this illustrative example, ply shape optimizer 592 may be implemented in software, hardware, firmware or a combination thereof. When software is used, the operations performed by ply shape optimizer 592 may be implemented in program code configured to run on hardware, such as a processor unit. When firmware is used, the operations performed by ply shape optimizer 592 may be implemented in program code and data and stored in persistent memory to run on a processor unit. When hardware is employed, the hardware may include circuits that operate to perform the operations in ply shape optimizer 592.

Ply shape optimizer 592 determines ply shapes 539 for each ply of plurality of panels 511 using objective function 540. Ply shape optimizer 592 may minimize ply boundary length 551 over all of plurality of groups 513. Ply shape optimizer 592 may maximize a connection quantity 550 over all of plurality of panels 511. A connection may be a common ply between two adjacent panels of plurality of panels 511. Connection quantity 550 may be a sum of connections.

In this illustrative example, fiber angle selector 594 may be implemented in software, hardware, firmware or a combination thereof. When software is used, the operations performed by fiber angle selector 594 may be implemented in program code configured to run on hardware, such as a processor unit. When firmware is used, the operations performed by fiber angle selector 594 may be implemented in program code and data and stored in persistent memory to run on a processor unit. When hardware is employed, the hardware may include circuits that operate to perform the operations in fiber angle selector 594.

Fiber angle selector 594 determines a fiber angle for each ply of plurality of panels 511 such that model 510 of composite structure 502 has a stiffness equal to desired stiffness distribution 508. Fiber angle selector 594 may generate equations 548 for set of lamination parameters 521 for each group of plurality of groups 513, combine equations 548 for each group of plurality of groups 513 into one system 547, and solve for plurality of angle variables 559 in system 547.

In this illustrative example, ply arranger 596 may be implemented in software, hardware, firmware or a combination thereof. When software is used, the operations performed by ply arranger 596 may be implemented in program code configured to run on hardware, such as a processor unit. When firmware is used, the operations performed by ply arranger 596 may be implemented in program code and data and stored in persistent memory to run on a processor unit. When hardware is employed, the hardware may include circuits that operate to perform the operations in ply arranger 596.

Ply arranger 596 may arrange plurality of plies 512 according to stacking sequence rules 576 to form ply arrangement 509. Stacking sequence rules 576 may include at least one of symmetry 578, separation 580 of plies with fiber angles 549 with more than a 45 degree difference, or avoidance of ply clusters 584.

The illustration of manufacturing environment 500 in FIGS. 5A and 5B is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of groups 513 only depicts first group 514 and second group 515, plurality of groups 513 may include any desirable number of groups. In some illustrative examples, plurality of groups 513 may include more than two groups.

As another example, although first group 514 is depicted as having only first panel 516 and second panel 517, first group 514 may have any desirable number of panels. In some illustrative examples, first group 514 may have only one panel. In other illustrative examples, first group 514 may have more than two panels. As another example, although first ply sequence 527 is depicted as having only first ply 530, first ply sequence 527 might have multiple discontinuous plies in plurality of plies 512 corresponding to groups that are not adjacent.

Figure 6:
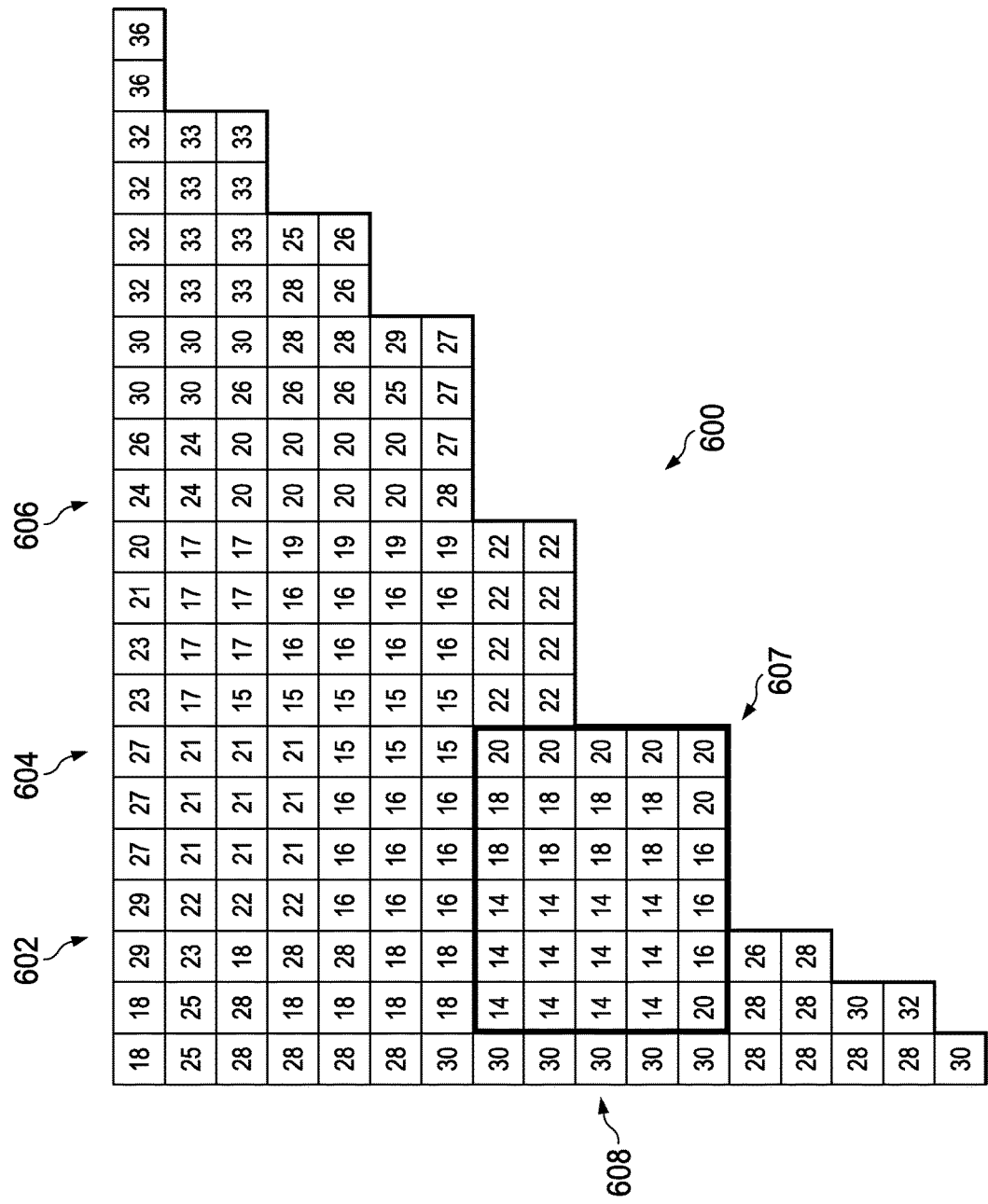
FIG. 6 is an illustration of a two-dimensional view of a model of a composite structure in accordance with an illustrative embodiment.

Turning now to FIG. 6, an illustration of a two-dimensional view of a model of a composite structure is depicted in accordance with an illustrative embodiment. View 600 may be a two-dimensional view of model 602 of a composite structure, such as composite skin 122 of wing 102 of FIG. 1. Model 602 is divided into plurality of panels 604. Plurality of panels 604 may be an implementation of plurality of panels 511 of FIG. 5A. Plurality of panels 604 has quantities of plies 606 indicated on each of plurality of panels 604. In some illustrative examples, quantities of plies 606 may be an actual number of plies to form a desired thickness for each of plurality of panels 604. For example, panel 608 of plurality of panels 604 may have 30 plies. When the composite structure is formed, the section of the composite structure represented by panel 608 may have 30 plies. In some other illustrative examples, quantities of plies 606 may be only half of the number of plies that will form the composite structure. For example, panel 608, as depicted in view 600, may have 30 plies. However, when the composite structure is formed, the section of the composite structure represented by panel 608 may have 60 plies. In these illustrative examples, panel 608 may represent the first half of a respective portion of the composite structure. The second half of the resulting composite structure may have the same types of plies as the first half. For example, the first half and the second half of the composite structure may be symmetric about a center plane. In some illustrative examples, symmetry for panel 608 may be taken into account when determining a stacking sequence for plurality of panels 604. In some illustrative examples, only a first half of the composite structure may be represented by panel 608 to simplify ply shape optimization and calculations for the ply directions.

As depicted, each of plurality of panels 604 are rectangular. However, plurality of panels 604 may be any desirable shape. For example, in some illustrative examples, plurality of panels 604 may be triangular. In some illustrative examples, plurality of panels 604 may have more than one shape.

Further, as depicted, each of plurality of panels 604 are substantially the same size. In other illustrative examples, plurality of panels 604 may be more than one size.

Turning now to FIG. 7, an illustration of a plurality of groups of panels is depicted in accordance with an illustrative embodiment. Plurality of groups 700 may be a view of a subset of plurality of panels 604 of FIG. 6 within box 7. Plurality of groups 700 includes first group 702, second group 704, third group 706, and fourth group 708. First group 702 may have twelve adjacent panels. As depicted, each panel in first group 702 has fourteen plies. Each panel in first group 702 has substantially the same set of lamination parameters.

Second group 704 may have eight adjacent panels. As depicted, each panel in second group 704 may have eighteen plies. Each panel in second group 704 also has substantially the same set of lamination parameters.

Third group 706 may have seven panels. As depicted, six of the seven panels in third group 706 are adjacent. However, panel 710 does not contact any of the other panels of third group 706. As depicted, each panel in third group 706 may have twenty plies. Each panel in third group 706 may has substantially the same set of lamination parameters. In this example, panel 710 is chosen to be grouped with the other seven panels in group 706. In another example, panel 710 may be considered as a separate group.

Fourth group 708 may have three consecutive panels. As depicted, each panel in fourth group 708 may have sixteen plies. Each panel in fourth group 708 has substantially the same in-plane lamination parameters.

Turning now to FIG. 8, an illustration of a plurality of groups of panels is depicted in accordance with an illustrative embodiment. View 800 is a view of plurality of groups 700 with plurality of connected panels 802 indicated by plurality of connections 804. In this illustrative example, plurality of connections 804 is represented by dots. Each connection of plurality of connections 804 may be a shared side of two panels of plurality of groups 700 covered by a same ply. For example, connection 806 is a shared side between panel 808 and panel 810 of first group 702. As depicted, plurality of connected panels 802 covers multiple groups. For example, connection 812 is a shared side between panel 808 of first group and panel 814 of fourth group 708. As depicted, plurality of connected panels 802 is connected panels for a ply covering first group 702, second group 704, and fourth group 708. As depicted, plurality of connected panels 802 includes thirty-six connections 804.

Plurality of connected panels 802 is only a single illustrative example of a quantity and location of connected panels for a single ply. However, each ply will have its own respective size and shape. The quantity of connections for a respective ply may be related to its size and shape. Although plurality of connected panels 802 is depicted as covering multiple groups, another illustrative example of a plurality of connected panels may only cover connected panels in a single group.

A total of all connections across all ply sequences in a composite structure may be referred to as a connection quantity. It may be desirable to maximize the connection quantity in a composite structure. By increasing the connection quantity in a composite structure, the resulting composite structure may have a higher degree of blending, which makes it easier to manufacture.

Turning now to FIG. 9, an illustration of ply sequences for a plurality of groups of panels is depicted in accordance with an illustrative embodiment. View 900 may be a representation of plurality of ply sequences in chart form. Chart 902 includes five columns. First column 904 may provide an indication of a ply sequence number.

Second column 906 represents the layup in the panels making up first group 702 of FIG. 7. A "1" in a row of second column 906 indicates that a ply in first group 702 of FIG. 7 is present in the respective ply sequence indicated by first column 904. When a "1" is present in a row of second column 906, a ply is present in the respective ply sequence for first group 702. A "0" in a row of second column 906 indicates that there are no plies in first group 702 of FIG. 7 in a respective ply sequence indicated by first column 904. When a "0" is present in a row of second column 906, a ply is absent in the respective ply sequence for first group 702.

The total number of plies in second column 906 may equal the total number of plies for first group 702 of FIG. 7. In some illustrative examples, the total number of plies in second column 906 may equal half the total number of plies for first group 702 of FIG. 7.

Third column 908 represents fourth group 708 of FIG. 7. A "1" in a row of third column 908 indicates that a ply in fourth group 708 of FIG. 7 is present in the respective ply sequence indicated by first column 904. When a "1" is present in a row of third column 908, a ply is present in the respective ply sequence for fourth group 708 of FIG. 7. A "0" in a row of third column 908 indicates that there are no plies in fourth group 708 of FIG. 7 in a respective ply sequence indicated by first column 904. When a "0" is present in a row of third column 908, a ply is absent in the respective ply sequence for fourth group 708. The total number of plies in third column 908 may equal the total number of plies for fourth group 708 of FIG. 7. In some illustrative examples, the total number of plies in third column 908 may equal half the total number of plies for fourth group 708 of FIG. 7.

Fourth column 910 represents second group 704 of FIG. 7. A "1" in a row of fourth column 910 indicates that a ply in second group 704 of FIG. 7 is present in the respective ply sequence indicated by first column 904. When a "1" is present in a row of fourth column 910, a ply is present in the respective ply sequence for second group 704 of FIG. 7. A "0" in a row of fourth column 910 indicates that there are no plies in second group 704 of FIG. 7 in a respective ply sequence indicated by first column 904. When a "0" is present in a row of fourth column 910, a ply is absent in the respective ply sequence for second group 704. The total number of plies in fourth column 910 may equal the total number of plies for second group 704 of FIG. 7. In some illustrative examples, the total number of plies in fourth column 910 may equal half the total number of plies for second group 704 of FIG. 7.

Fifth column 912 represents third group 706 of FIG. 7. A "1" in a row of fifth column 912 indicates that a ply in third group 706 of FIG. 7 is present in the respective ply sequence indicated by first column 904. When a "1" is present in a row of fifth column 912, a ply is present in the respective ply sequence for third group 706 of FIG. 7. A "0" in a row of fifth column 912 indicates that there are no plies in third group 706 of FIG. 7 in a respective ply sequence indicated by first column 904. When a "0" is present in a row of fifth column 912, a ply is absent in the respective ply sequence for third group 706 of FIG. 7. The total number of plies in fifth column 912 may equal the total number of plies for third group 706 of FIG. 7. In some illustrative examples, the total number of plies in fifth column 912 may equal half the total number of plies for third group 706 of FIG. 7.

As depicted, a ply in first ply sequence 914 will be present in first group 702, second group 704, and third group 706. In this illustrative example, a ply in second ply sequence 916 will be present in first group 702 and second group 704. As a result, the shape of a ply in first ply sequence 914 would be different than the shape of a ply in second ply sequence 916.

As depicted, a ply in third ply sequence 918 will be present in first group 702, second group 704, and third group 706. As a result, the shape of a ply in first ply sequence 914 and a ply in third ply sequence 918 would be substantially the same.

As depicted, fourth ply sequence 920, fifth ply sequence 922, sixth ply sequence 924, seventh ply sequence 926, eighth ply sequence 928, ninth ply sequence 930, tenth ply sequence 932, and eleventh ply sequence 934 are duplicate plies. In this example, the duplicate quantity is eight. In this example, the duplicate quantity reduces the number of degrees of freedom of a system of equations by four if the quantity of lamination parameters in the set of lamination parameters is four.

As depicted, quantity 936 of plurality of ply sequences describes the quantity of ply sequences for plurality of groups 700 of FIG. 7. As depicted, quantity 936 is twenty-two ply sequences. Quantity 936 of plurality of ply sequences may be selected based on a quantity of lamination parameters for the composite structure to be formed.

In some illustrative examples, chart 902 may include more or fewer columns. For example, additional columns may be present in chart 902 when more groups are present in the model. For example, to calculate all ply angles for each panel of plurality of panels 604 of model 602, chart 902 may also include at least a fifth group. Chart 902 may also include further groups such as a sixth group, seventh group, or any other desirable number of groups.

Additionally, although only twenty-two ply sequences are depicted, more or fewer ply sequences may be present in chart 902. More ply sequences may be present with increased number of groups or increased number of plies in at least one group. For example, if first group 702 included thirty plies, there would necessarily be more than twenty-two ply sequences. Likewise, if chart 902 also included a fifth group, a sixth group, a seventh group, and an eighth group, there may be more than twenty-two ply sequences such that a required quantity of degrees of freedom is present for a system of equations.

Figure 10:
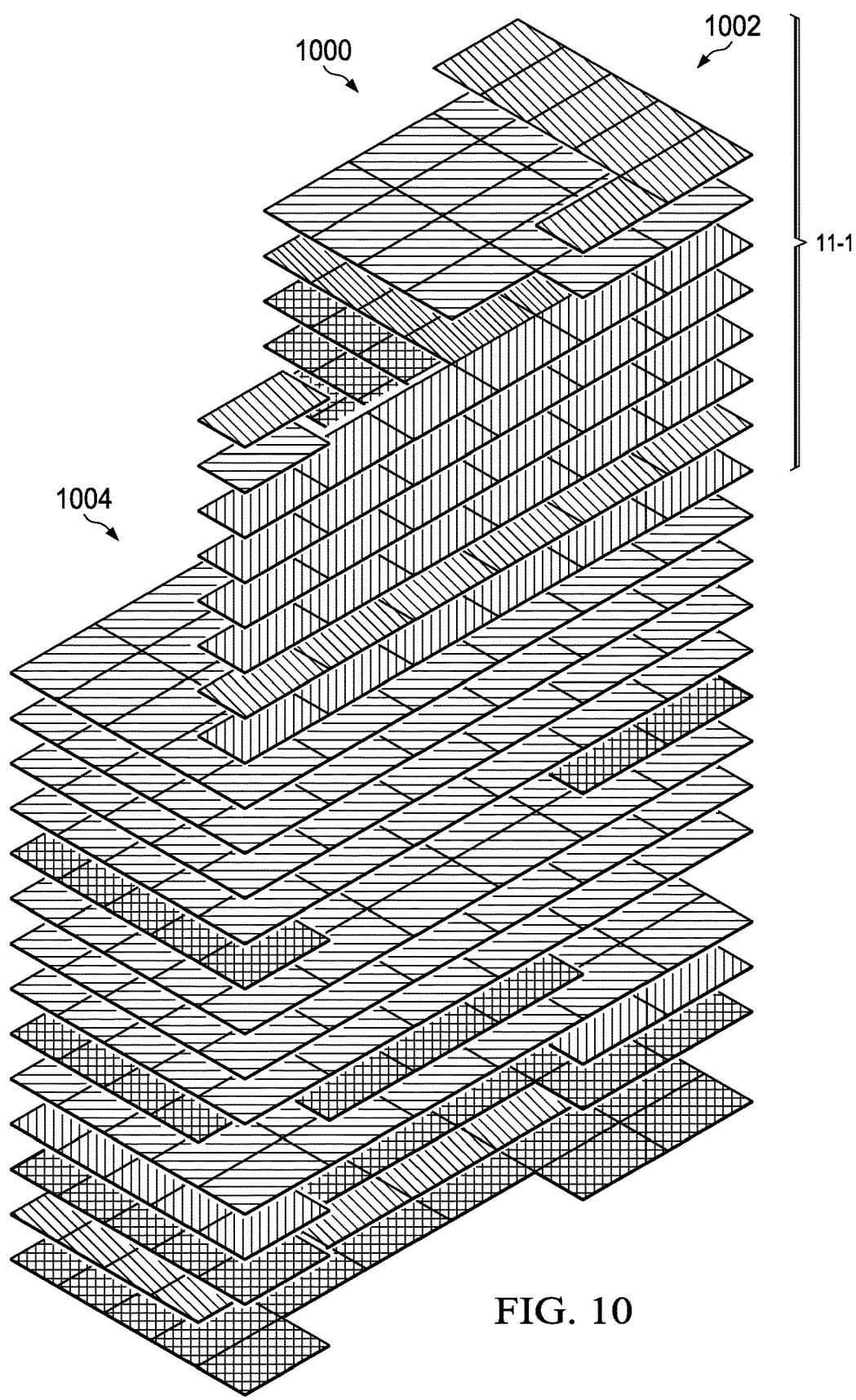
FIG. 10 is an illustration of an exploded view of a ply arrangement in accordance with an illustrative embodiment.

Turning now to FIG. 10, an illustration of an exploded view of a ply arrangement is depicted in accordance with an illustrative embodiment. Ply arrangement 1000 may be an exploded three-dimensional representation of ply arrangement 509 of FIG. 5A. Ply arrangement 1000 may have plurality of plies 1002 in plurality of ply sequences 1004. Each panel of plurality of panels 604 of FIG. 6 may contain at least one ply of plurality of plies 1002.

Figure 11:
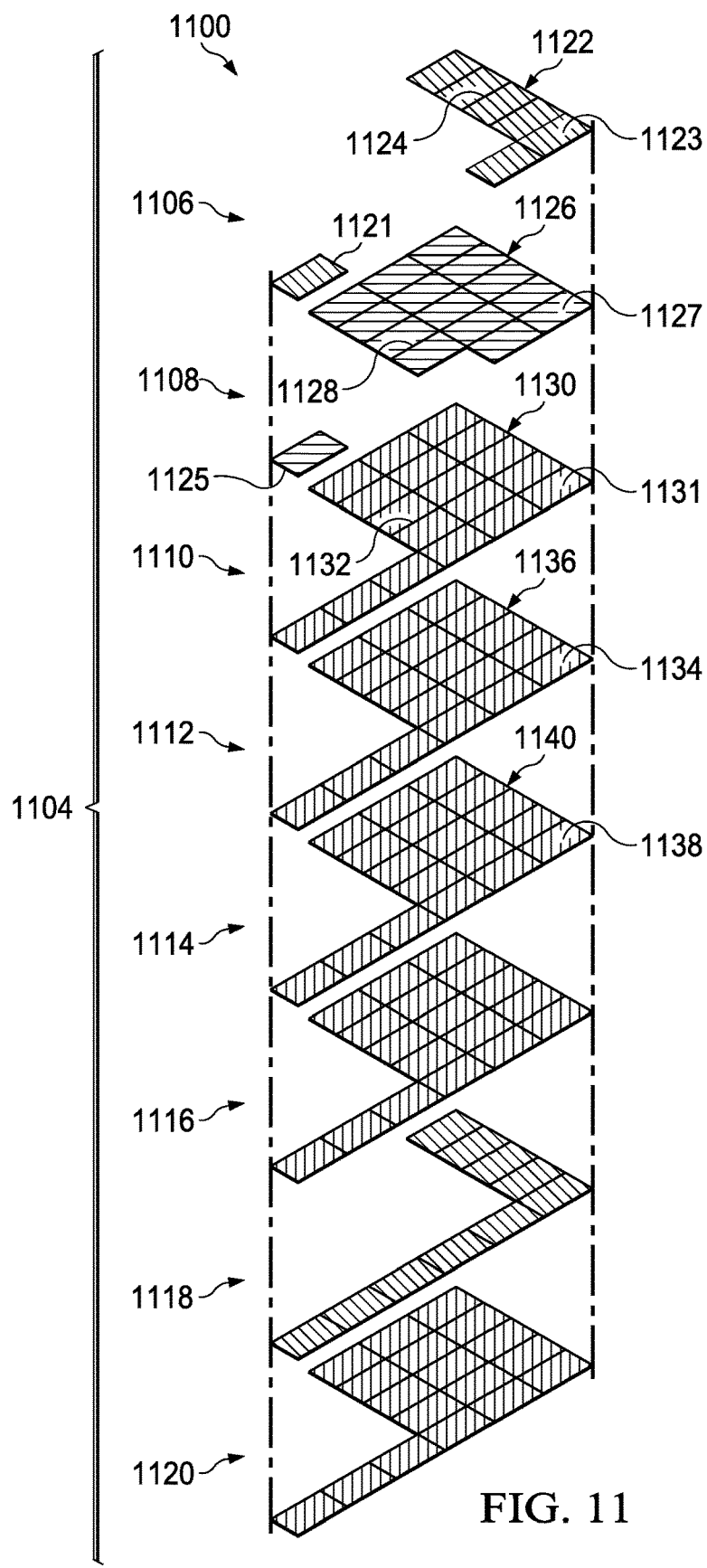
FIG. 11 is an illustration of plies in ply sequences in accordance with an illustrative embodiment.

Turning now to FIG. 11, an illustration of plies in ply sequences is depicted in accordance with an illustrative embodiment. View 1100 may be a view of a portion of plurality of plies 1002 in plurality of ply sequences 1004 of FIG. 10. In some illustrative examples, view 1100 may be a view within bracket 11-1 in FIG. 10. As depicted, view 1100 may include plurality of plies 1102 in plurality of ply sequences 1104. Plurality of ply sequences 1104 includes first ply sequence 1106, second ply sequence 1108, third ply sequence 1110, fourth ply sequence 1112, fifth ply sequence 1114, sixth ply sequence 1116, seventh ply sequence 1118, and eighth ply sequence 1120. First ply sequence 1106 corresponds to ply sequence 936 in FIG. 9. As shown in FIG. 9, third group 706 of FIG. 7 is present in first ply sequence 1106. Ply 1121 and ply 1122 are present within first ply sequence 1106. Ply 1122 has ply shape 1123 and markings 1124. Markings 1124 may indicate which panels of the plurality of panels are included in ply 1122. Markings 1124 are only for reference purposes.

Second ply sequence 1108 corresponds to ply sequence 21 in FIG. 9. As shown in FIG. 9, second group 704 and third group 706 of FIG. 7 are present in second ply sequence 1108. Ply 1125 and ply 1126 are present in second ply sequence 1108. Ply 1126 has ply shape 1127 and markings 1128. Markings 1128 may indicate which panels of the plurality of panels include ply 1126. As depicted, ply 1126 may be included in more panels than ply 1122. The difference in the number of panels may be seen by comparing markings 1124 and markings 1128. Further, the difference in the number of panels may also be seen by comparing ply shape 1123 and ply shape 1127.

Third ply sequence 1110 corresponds to ply sequence 20 in FIG. 9. As shown in FIG. 9, second group 704, third group 706, and fourth group 708 of FIG. 7 are present in third ply sequence 1110. Ply 1130 is present in third ply sequence 1110. Ply 1130 has ply shape 1131 and markings 1132. Markings 1132 may indicate which panels of the plurality of panels include ply 1130.

Fourth ply sequence 1112 corresponds to ply sequence 19 in FIG. 9. As shown in FIG. 9, second group 704, third group 706, and fourth group 708 of FIG. 7 are present in fourth ply sequence 1112. As depicted, ply 1130 may be included in the same panels as ply 1136. As a result, ply shape 1131 and ply shape 1134 may be substantially the same.

Fifth ply sequence 1114 corresponds to ply sequence 18 in FIG. 9. As shown in FIG. 9, second group 704, third group 706, and fourth group 708 of FIG. 7 are present in fifth ply sequence 1110. As depicted, ply shape 1134 of ply 1136 in fourth ply sequence 1112 and ply shape 1138 of ply 1140 in fifth ply sequence 1114 are substantially the same as ply shape 1131 of ply 1130. As depicted, third ply sequence 1110, fourth ply sequence 1112, fifth ply sequence 1114, and sixth ply sequence 1116 are duplicate ply sequences. Duplicate ply sequences can be identified by observing the ply shapes as in FIG. 11. Duplicate ply sequences may also be identified by observing the presence of ones and zeroes in FIG. 9. Duplicate ply sequences may be limited such that a resulting system of equations is solvable.

The number of ply sequences and the quantity of lamination parameters in the set of lamination parameters may limit the number of plies having the same ply shape in a model. Plies having the same ply shape may act as a sublaminate which may be undesirable. This may be undesirable if the number of plies in the sublaminate is larger than the quantity of lamination parameters to be matched. The number of plies in the sublaminate may reduce the number of degrees of freedom of a system of equations used to determine the ply angles.

Figure 12:
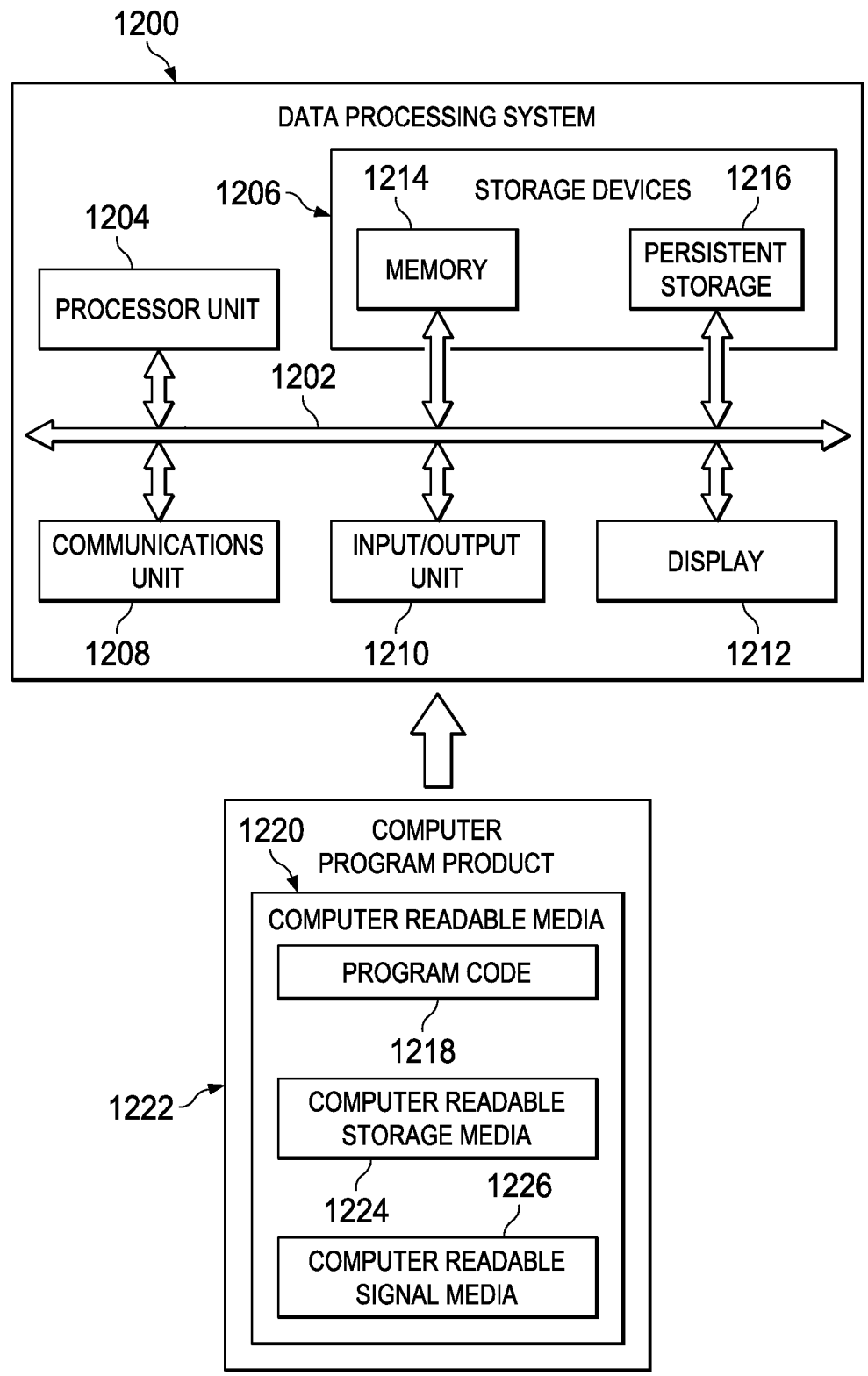
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 504 in FIG. 5B. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multiprocessor core, and/or some other type of processor, depending on the implementation. In some cases, processor unit 1204 may take the form of a hardware unit, such as a circuit system, an application-specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

Figure 13:
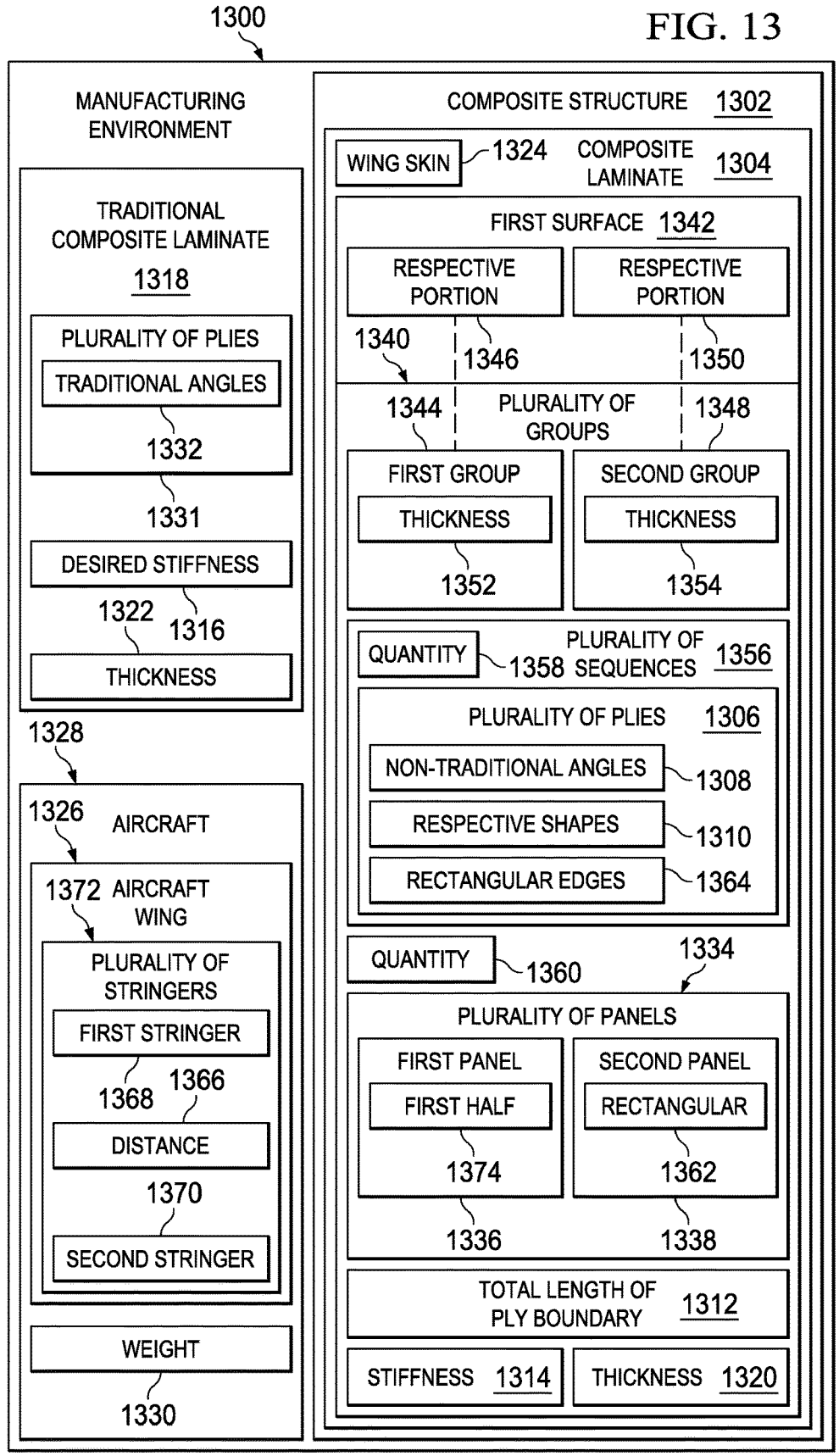
FIG. 13 is an illustration of a block diagram of a manufacturing environment in accordance with an illustrative embodiment.

Turning now to FIG. 13, an illustration of a block diagram of a manufacturing environment is depicted in accordance with an illustrative embodiment. Manufacturing environment 1300 may be an implementation of part of manufacturing environment 500 of FIGS. 5A and 5B.

Manufacturing environment 1300 includes composite structure 1302. Composite structure 1302 may be composite laminate 1304 formed of plurality of plies 1306 having non-traditional angles 1308. Each of plurality of plies 1306 has a respective shape of respective shapes 1310 configured to minimize total length of ply boundary 1312 over all of plurality of plies 1306. Composite laminate 1304 has stiffness 1314 equal to desired stiffness 1316 of traditional composite laminate 1318.

Traditional composite laminate 1318 may be conventionally used. However, it may be desirable to replace traditional composite laminate 1318 with composite laminate 1304. For example, composite laminate has thickness 1320 less than thickness 1322 of traditional composite laminate 1318. Having a reduced thickness may also reduce the weight of composite laminate 1304 compared to traditional composite laminate 1318. In some illustrative examples, composite laminate 1304 may be wing skin 1324 of aircraft wing 1326 of aircraft 1328. It may be desirable to have thickness 1320 to reduce weight 1330 of aircraft 1328.

Traditional composite laminate 1318 may be formed of plurality of plies 1331 having traditional angles 1332. In some illustrative examples, it may be desirable to replace traditional composite laminate 1318 with composite laminate 1304 such that one or more of traditional angles 1332, such as at least one of 0, +45, −45, or 90, are not present in composite laminate 1304.

Composite laminate 1304 may include plurality of panels 1334. Plurality of panels 1334 may be formed of plurality of plies 1306. Each panel of plurality of panels 1334 shares at least one ply with an adjacent panel. For example, if first panel 1336 and second panel 1338 are adjacent, first panel 1336 and second panel 1338 may share at least one ply of plurality of plies 1306.

Plurality of panels 1334 may be grouped into plurality of groups 1340. Each group of plurality of groups 1340 contains a respective portion of first surface 1342 of composite laminate 1304. For example, first group 1344 of plurality of groups 1340 may contain respective portion 1346 of first surface 1342. As another example, second group 1348 of plurality of groups 1340 may contain respective portion 1350 of first surface 1342. In some illustrative examples, FIG. 7 may be a depiction of a portion of plurality of groups 1340 and first surface 1342.

A respective layup of each group of plurality of groups 1340 is different than a respective layup of each other group of plurality of groups 1340. For example, a layup of first group 1344 may differ from a layup of second group 1348. For example, for any two groups in plurality of groups 1340 having a thickness difference of fewer plies than a quantity of lamination parameters, the two groups have a quantity of plies that is present in only one of the two groups equal to at least the quantity of lamination parameters. The lamination parameters may be plurality of lamination parameters 556 of FIG. 5B. In some illustrative examples, quantity of lamination parameters may be quantity 557 of FIG. 5B.

For example, if thickness 1352 and thickness 1354 have a difference of fewer plies than the quantity of lamination parameters, first group 1344 and second group 1348 have at least a quantity of plies in only first group 1344 or second group 1348 equal to at least the quantity of lamination parameters. For example, if there are six lamination parameters and the difference between thickness 1352 and thickness 1354 is less than six plies, there are at least six plies that are found in only first group 1344 or only second group 1348. As another example, if there are four lamination parameters and the difference between thickness 1352 and thickness 1354 is less than four plies, there are at least four plies that are found in only first group 1344 or only second group 1348.

In some illustrative examples, each ply of a first half of a panel of the plurality of panels has a different fiber angle value than each other ply of the first half of the panel. For example, each ply of first half 1374 of first panel 1336 of plurality of panels 1334 has a different fiber angle value than each other ply of first half 1374 of first panel 1336.

Composite laminate 1304 may have plurality of ply sequences 1356 containing plurality of plies 1306. Quantity 1358 of plurality of ply sequences 1356 is equal to at least quantity 1360 of plurality of groups 1340 times a quantity of lamination parameters.

Plurality of plies 1306 may have respective shapes 1310 based upon which groups of plurality of groups 1340 contain each respective ply. Plurality of plies 1306 may also have respective shapes 1310 based on shapes of plurality of panels 1334. In some illustrative examples, at least one panel of plurality of panels 1334 may be rectangular. For example, second panel 1338 may be rectangular 1362. In some illustrative examples, at least one ply of plurality of plies 1306 may have rectangular edges 1364.

When composite laminate 1304 is wing skin 1324 for aircraft wing 1326, a width of a panel of plurality of panels 1334 may be a distance between two adjacent stringers of aircraft wing 1326. For example, at least one of first panel 1336 or second panel 1338 may have a width equal to distance 1366 between first stringer 1368 and second stringer 1370 of plurality of stringers 1372.

The different components shown in FIGS. 1 and 6-13 may be combined with components in FIGS. 5A and 5B, used with components in FIGS. 5A and 5B, or a combination of the two. Additionally, some of the components in FIGS. 1 and 6-13 may be illustrative examples of how components shown in block form in FIGS. 5A and 5B can be implemented as physical structures.

Figure 14:
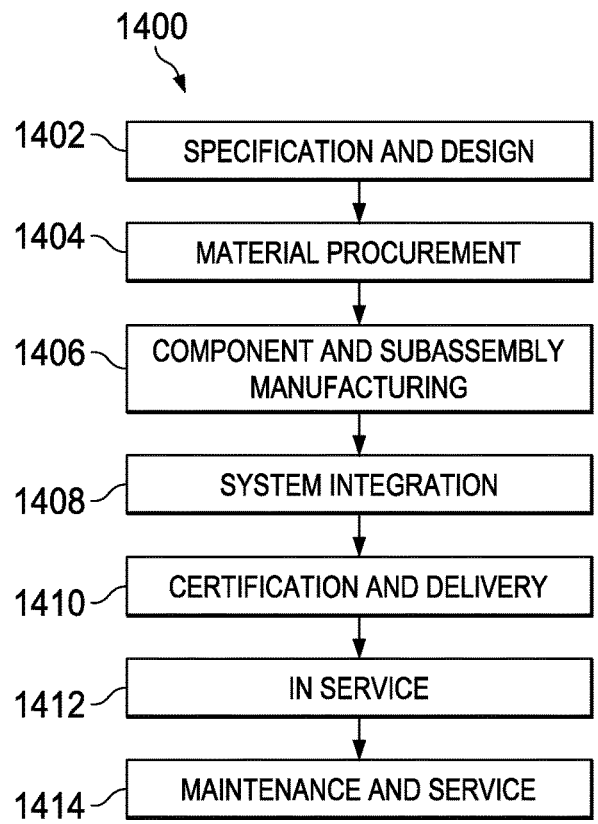
FIG. 14 is an illustration of an aircraft manufacturing and service method in the form of a block diagram in accordance with an illustrative embodiment.
Figure 15:
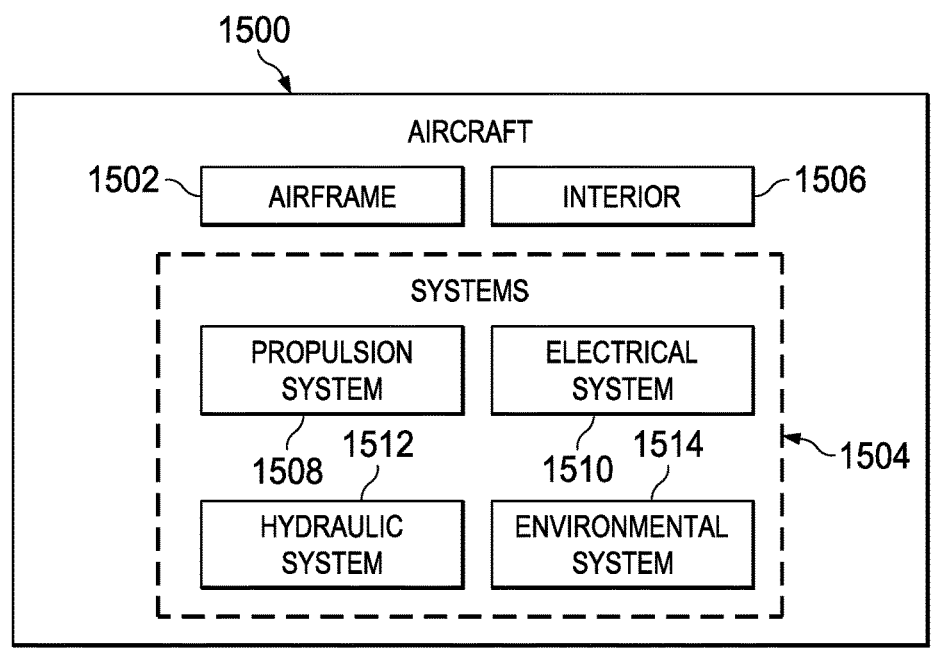
FIG. 15 is an illustration of an aircraft in the form of a block diagram in which an illustrative embodiment may be implemented.

The illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 of FIG. 15 and material procurement 1404.

During production, component and subassembly manufacturing 1406 and system integration 1408 of aircraft 1500 of FIG. 15 takes place. Thereafter, aircraft 1500 of FIG. 15 may go through certification and delivery 1410 in order to be placed in service 1412. While in service 1412 by a customer, aircraft 1500 of FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 of FIG. 14 and may include airframe 1502 with systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 of FIG. 14. One or more illustrative embodiments may be used during specification and design 1402 of aircraft 1500 as well as component and subassembly manufacturing 1406. For example, a composite structure of aircraft 1500 may be designed using the illustrative embodiments during specification and design 1402. Further, the composite structure may be formed using the resulting ply arrangement during component and subassembly manufacturing 1406.

The illustrative embodiments provide a method and apparatus for determining a layup for a composite structure exactly matching a specified stiffness and thickness distribution. Specifically, the illustrative embodiments provide a method and apparatus for determining a layup for a nontraditional composite structure exactly matching a specified stiffness and thickness distribution.

In the illustrative examples, an objective function is used to determine ply shapes in the composite structure. The objective function may be solved within desirable conditions. The desirable conditions may include maximizing connectivity while filling all ply sequences. By having a desirable connectivity, loads may be transferred as desirable through a composite component. Further, by having a desirable connectivity, manufacturing time may be reduced.

The number of duplicate ply sequences may be limited. Degrees of freedom may be controlled by controlling a difference and following an equation for a number of ply sequences.

Equations with a plurality of lamination parameters and a plurality of angle variables form a system. The system may be solved to determine the fiber angles of each ply of the composite structure.

Using the illustrative embodiments, non-traditional laminates may be designed to have desirable connectivity. Further, by using the illustrative embodiments, design and layout of a composite structure may take less time. Design and layout using the illustrative examples may take less time than conventional design processes which continuously refine after testing. Yet further, the layup process for a composite structure designed by the illustrative examples may take less time due to at least one of less machine downtime, greater machine efficiency, or ply shape optimization.

The different illustrative embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include a compact disk-read only memory (CD-ROM), a compact disk-read/write (CD-R/W), and a DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a composite structure, wherein the composite structure is a non-traditional laminate structure having a stiffness equal to a desired stiffness of a traditional composite laminate part, wherein the non-traditional laminate structure has at least one ply with a fiber angle other than 0°, 90° or ±45°, the method comprising:
   receiving a desired thickness and a desired stiffness distribution for the composite structure;
   splitting a model of the composite structure into a plurality of panels;
   determining a set of lamination parameters and a quantity of plies for each panel of the plurality of panels using the desired thickness and the desired stiffness distribution for the composite structure, wherein the lamination parameters are non-dimensional parameters that together with the desired thickness and material invariants describe a laminate stiffness matrix independent of the quantity of plies;
   determining ply shapes for each ply of the plurality of panels using an objective function;
   determining a fiber angle for the each ply of the plurality of panels, such that the model of the composite structure has a stiffness equal to the desired stiffness distribution; and
   laying up composite material according to the model with determined ply shapes and determined fiber angles to form the composite structure, wherein the composite structure has the stiffness equal to the desired stiffness distribution.

2. The method of claim 1, wherein each ply of a first half of a panel of the plurality of panels has a different fiber angle value than each other ply of the first half of the panel.

3. The method of claim 1 further comprising:
   arranging the plies according to stacking sequence rules to form a ply arrangement.

4. The method of claim 3, wherein the stacking sequence rules include at least one of symmetry, separation of the plies with fiber angles with more than a 45 degree difference, or avoidance of ply clusters.

5. The method of claim 1 further comprising:
   grouping panels of the plurality of panels with a same quantity of plies and a same set of lamination parameters to form a plurality of groups, wherein each panel of a group of the plurality of groups has a same layup.

6. The method of claim 5 further comprising:
   creating a plurality of ply sequences for the plurality of groups, wherein each of the plurality of ply sequences represents at least one ply in the composite structure.

7. The method of claim 6, wherein determining ply shapes for the each ply of the plurality of panels comprises minimizing a total length of a ply boundary over all of the plurality of groups.

8. The method of claim 6, wherein determining a fiber angle for the each ply of the plurality of panels comprises:
   generating equations for the set of lamination parameters for each group of the plurality of groups;
   combining the equations for the each group of the plurality of groups into a system; and
   solving for a plurality of angle variables in the system.

9. The method of claim 8, wherein the system is underdetermined and multiple solutions are possible, further comprising:
   selecting one of the multiple solutions based on at least one of a desirable stacking sequence or matching fiber angles with the ply shapes.

10. The method of claim 8, wherein a quantity of the plurality of ply sequences is equal to at least a quantity of the plurality of groups times a quantity of lamination parameters in the set of lamination parameters.

11. The method of claim 8, wherein a quantity of the plurality of ply sequences is chosen such that for any two groups in the plurality of groups with a thickness difference of fewer plies than a quantity of lamination parameters in the set of lamination parameters, there are at least a quantity of ply sequences equal to the quantity of lamination parameters in the set of lamination parameters in which the two groups have different ply present or absent states.

12. The method of claim 1, wherein determining ply shapes for the each ply of the plurality of panels comprises:
   maximizing a connection quantity over all of the plurality of panels, wherein a connection is a common ply between two adjacent panels of the plurality of panels, and wherein a connection quantity is a sum of connections.

13. The method of claim 1, wherein determining ply shapes for the each ply of the plurality of panels comprises:
   limiting a quantity of plies with a same geometry to less than a quantity of lamination parameters.

14. The method of claim 1, wherein a first panel and a second panel of the plurality of panels have a different number of plies.

15. A method of manufacturing a composite structure, wherein the composite structure is a non-traditional laminate structure having a stiffness equal to a desired stiffness of a traditional composite laminate part, wherein the non-traditional laminate structure has at least one ply with a fiber angle other than 0°, 90° or ±45°, the method comprising:
   receiving a desired thickness and a desired stiffness distribution for the composite structure;
   splitting a model of the composite structure into a plurality of panels;
   determining a set of lamination parameters and a quantity of plies for each panel of the plurality of panels using the desired thickness and the desired stiffness distribution for the composite structure;
   determining ply shapes for each ply of the plurality of panels using an objective function, wherein determining the ply shapes for each ply of the plurality of panels using the objective function comprises:
   grouping panels of the plurality of panels with a same quantity of plies and same set of lamination parameters to form a plurality of groups, wherein each panel of a group of the plurality of groups has a same layup; and
   creating a plurality of ply sequences for the plurality of groups, wherein each of the plurality of ply sequences represents at least one ply for at least one panel in the plurality of panels;
   determining a fiber angle for each ply of the plurality of panels, wherein determining a fiber angle for each ply of the plurality of panels comprises:
   generating equations for the set of lamination parameters for each group of the plurality of groups;

combining the equations for each group of the plurality of groups into a system; and solving for a plurality of angle variables in the system; and laying up composite material to form each of the plurality of panels having a determined quantity of plies and determined fiber angle, wherein forming each of the plurality of panels forms the composite structure, wherein the composite structure has the stiffness equal to the desired stiffness distribution.

16. The method of claim 15, wherein a quantity of the plurality of ply sequences is equal to at least a quantity of the plurality of groups times a quantity of lamination parameters in the set of lamination parameters.

17. The method of claim 16, wherein a quantity of the plurality of ply sequences is chosen such that for any two groups in the plurality of groups with a thickness difference of fewer plies than a quantity of lamination parameters in the set of lamination parameters, there are at least a quantity of ply sequences equal to a quantity of lamination parameters in the set of lamination parameters in which the two groups have different ply present or absent states.

18. The method of claim 15, wherein the system is underdetermined and multiple solutions are possible, further comprising:

selecting one of the multiple solutions based on at least one of a desirable stacking sequence or matching fiber angles with the ply shapes.

19. The method of claim 15, wherein determining ply shapes for the each ply of the plurality of panels comprises:

maximizing a connection quantity over all of the plurality of groups, wherein a connection is a common ply between two adjacent panels of the plurality of panels, and wherein a connection quantity is a sum of connections.

20. The method of claim 15, wherein determining ply shapes for the each ply of the plurality of panels comprises:

limiting a quantity of plies with a same geometry to less than a quantity of lamination parameters.

21. A method for forming a composite structure, wherein the composite structure is a non-traditional laminate structure having a stiffness equal to a desired stiffness of a traditional composite laminate part, wherein the non-traditional laminate structure has at least one ply with a fiber angle other than 0°, 90° or ±45°, the method comprising:

receiving a desired thickness and a desired stiffness distribution for the composite structure;

splitting a model of the composite structure into a plurality of panels;

determining a set of lamination parameters and a quantity of plies for each panel of the plurality of panels using the desired thickness and the desired stiffness distribution for the composite structure, wherein the lamination parameters are non-dimensional parameters that together with the desired thickness and material invariants describe a laminate stiffness matrix independent of the quantity of plies;

determining ply shapes for each ply of the plurality of panels using an objective function;

determining a fiber angle for each ply of the plurality of panels;

arranging the plies according to stacking sequence rules to form a ply arrangement, wherein the stacking sequence rules include at least one of symmetry, separation of plies with fiber angles with more than a 45 degrees difference, or avoidance of ply clusters; and laying up composite material according to the ply arrangement to form the composite structure, wherein the composite structure has the stiffness equal to the desired stiffness distribution.

22. The method of claim 21, wherein determining ply shapes for the each ply of the plurality of panels using an objective function comprises:

grouping panels of the plurality of panels with a same quantity of plies and same set of lamination parameters to form a plurality of groups, wherein each panel of a group of the plurality of groups has a same layup;

creating a plurality of ply sequences for the plurality of groups, wherein each of the plurality of ply sequences represents at least one ply in the plurality of panels; and determining a ply shape for each ply of the plurality of ply sequences.

23. The method of claim 22, wherein determining the fiber angle for the each ply of the plurality of panels comprises:

generating equations for the set of lamination parameters for each group of the plurality of groups;

combining the equations for the each group of the plurality of groups into a system; and solving for a plurality of angle variables in the system.

24. The method of claim 1, wherein the set of lamination parameters comprises twelve lamination parameters: $(V_{1A}, V_{2A}, V_{3A}, V_{4A})$, $(V_{1B}, V_{2B}, V_{3B}, V_{4B})$, and $(V_{1D}, V_{2D}, V_{3D}, V_{4D})$ which are defined by equations:

$$\begin{pmatrix} V_{1A} \\ V_{2A} \\ V_{3A} \\ V_{4A} \end{pmatrix} = \sum_{k=1}^{N} z_k - z_{k-1} \begin{pmatrix} \cos(2\theta_k) \\ \sin(2\theta_k) \\ \cos(4\theta_k) \\ \sin(4\theta_k) \end{pmatrix}$$

$$\begin{pmatrix} V_{1B} \\ V_{2B} \\ V_{3B} \\ V_{4B} \end{pmatrix} = \sum_{k=1}^{N} \frac{z_k^2 - z_{k-1}^2}{2} \begin{pmatrix} \cos(2\theta_k) \\ \sin(2\theta_k) \\ \cos(4\theta_k) \\ \sin(4\theta_k) \end{pmatrix}$$

$$\begin{pmatrix} V_{1D} \\ V_{2D} \\ V_{3D} \\ V_{4D} \end{pmatrix} = \sum_{k=1}^{N} \frac{z_k^3 - z_{k-1}^3}{3} \begin{pmatrix} \cos(2\theta_k) \\ \sin(2\theta_k) \\ \cos(4\theta_k) \\ \sin(4\theta_k) \end{pmatrix}$$

25. The method of claim 1, wherein $(U_1, U_2, U_3, U_4,$ and $U_5)$ are the material invariants that depend only on ply material properties and are defined as follows:

$U_1 = (3*Q_{11} + 3*Q_{22} + 2Q_{12} + 4Q_{66})/8$ $U_2 = (Q_{11} - Q_{22})/2$ $U_3 = (Q_{11} + Q_{22} - 2Q_{12} - 4Q_{66})/8$ $U_4 = (Q_{11} + Q_{22} + 6Q_{12} - 4Q_{66})/8$ $U_5 = (Q_{11} + Q_{22} - 2Q_{12} + 4Q_{66})/8$

26. The method of claim 1, wherein a relationship between normalized lamination parameters, thickness, and stiffness matrices A, B, D is given by equations:

$$\begin{pmatrix} A_{11} & A_{12} & A_{16} \\ A_{21} & A_{22} & A_{26} \\ A_{61} & A_{62} & A_{66} \end{pmatrix} =$$

-continued $$t \begin{pmatrix} U_1 + U_2\overline{V}_{1A} + U_3\overline{V}_{3B} & U_4 - U_3\overline{V}_{3A} & \frac{U_2}{2}\overline{V}_{2A} + U_3\overline{V}_{4A} \\ \overline{A}_{12} & U_1 - U_2\overline{V}_{1A} + U_3\overline{V}_{3A} & \frac{U_2}{2}\overline{V}_{2A} - U_3\overline{V}_{4A} \\ \overline{A}_{16} & \overline{A}_{26} & U_5 - U_3\overline{V}_{3A} \end{pmatrix}$$

$$\begin{pmatrix} B_{11} & B_{12} & B_{16} \\ B_{21} & B_{22} & B_{26} \\ B_{61} & B_{62} & B_{66} \end{pmatrix} =$$

$$\frac{t^2}{4} \begin{pmatrix} U_2\overline{V}_{1B} + U_3\overline{V}_{3B} & -U_3\overline{V}_{3B} & \frac{U_2}{2}\overline{V}_{2B} + U_3\overline{V}_{4B} \\ \overline{B}_{12} & -U_2\overline{V}_{1B} + U_3\overline{V}_{3B} & \frac{U_2}{2}\overline{V}_{2B} + U_3\overline{V}_{4B} \\ \overline{B}_{16} & \overline{B}_{26} & -U_3\overline{V}_{3B} \end{pmatrix}$$

and $$\begin{pmatrix} D_{11} & D_{12} & D_{16} \\ D_{21} & D_{22} & D_{26} \\ D_{61} & D_{62} & D_{66} \end{pmatrix} =$$

$$\frac{t^3}{12} \begin{pmatrix} U_1 + U_2\overline{V}_{1D} + U_3\overline{V}_{3D} & U_4 - U_3\overline{V}_{3D} & \frac{U_2}{2}\overline{V}_{2D} + U_3\overline{V}_{4D} \\ \overline{D}_{12} & U_1 - U_2\overline{V}_{1D} + U_3\overline{V}_{3B} & \frac{U_2}{2}\overline{V}_{2D} - U_3\overline{V}_{4D} \\ \overline{D}_{16} & \overline{D}_{26} & U_5 - U_3\overline{V}_{3D} \end{pmatrix}$$

\* \* \* \* \*